United States Patent

Russ et al.

Patent Number: 5,810,890
Date of Patent: Sep. 22, 1998

[54] PROCESS FOR DYEING SYNTHETIC POLYAMIDE FIBER MATERIALS

[75] Inventors: Werner Hubert Russ, Flörsheim, Germany; Mike Elliott, Greetland Halifax, United Kingdom; Robert Dewhurst, Gloucester, United Kingdom; Charles Richard Langrick, Middlesborough, United Kingdom; David John Marfell, Gloucester, United Kingdom

[73] Assignee: Dystar Textilfarben GmbH & Co. Deutschland KG, Frankfurt, Germany

[21] Appl. No.: 721,192

[22] Filed: Sep. 27, 1996

[30] Foreign Application Priority Data

Sep. 28, 1995 [DE] Germany ................. 195 36 223.3

[51] Int. Cl.$^6$ ...................................................... D06P 3/10
[52] U.S. Cl. .................. 8/531; 8/529; 8/549; 8/638; 8/641; 8/590; 8/597; 8/604; 8/924
[58] Field of Search ................. 8/549, 638–641, 8/643, 590, 597, 604, 529, 531, 924

[56] References Cited

U.S. PATENT DOCUMENTS

| 3,802,837 | 4/1974 | Bohnert et al. |
| 3,990,846 | 11/1976 | Lehinant et al. ............ 8/531 |
| 4,762,524 | 8/1988 | Chambers et al. |
| 5,356,440 | 10/1994 | Galafassi et al. |

FOREIGN PATENT DOCUMENTS

| 0 586 331 | 3/1994 | European Pat. Off. |
| 0 637 915 | 2/1995 | European Pat. Off. |

OTHER PUBLICATIONS

Duschewa, M., et al, *Melliand Textilberichte* 70:360–364 (1989) no month available.

*Primary Examiner*—Margaret Einsmann

[57] ABSTRACT

A process for dyeing synthetic polyamide fibers, in particular in form of micro fibers, is described comprising the use of polyamide fibers having an amino end group content of at least 60 gram equivalents per 1000 kilograms of polyamide polymer and using a dye composition of water-soluble dyes containing at least one dye having 1 or 2 vinylsulfonyl groups and at least 1 dye having 1 or 2 groups of the general formula (A)

$$-SO_2-CH_2-CH_2-N(R)-V-X \quad (A)$$

(in which R is hydrogen or alkyl of 1 to 4 carbon atoms which may be interrupted by 1 or 2 hetero groups and substituted by sulfo, carboxy, hydroxy, sulfato, phosphato and/or lower alkanoylamino, V is a covalent bond or alkylene of 2 to 4 carbon atoms or a group of the formula $-CO-NH-CH_2-CH_2-$ and X is a water-solubilizing group), the dyes with the vinylsulfonyl group and the dyes with the group of the formula (A) being present in the ratio of from 90:10 mol-% to 60:40 mol-%, or using a dye composition containing at least one water-soluble dyestuff having 1 or 2 vinylsulfonyl or β-sulfatoethylsulfonyl groups, and an amino compound of the general formula (B)

$$H-N(R)-V-X \quad (B)$$

the dye(s) with the vinylsulfonyl and/or β-sulfatoethylsulfonyl groups being present relative to the amine of formula (B) in the ratio of from 100:10 mol-% to 100:40 mol-%.

20 Claims, No Drawings

PROCESS FOR DYEING SYNTHETIC POLYAMIDE FIBER MATERIALS

The invention relates to the technical field of dyeing synthetic polyamide fiber material with fiber-reactive dyes.

It is known to dye wool with sulfo-containing dyes having a fiber-reactive β-sulfatoethylsulfonyl group. This gives rise to dyeings having satisfactory wet fastness and brightness if wool is dyed in the dyeing liquor at boiling temperature for at least 30 minutes while maintaining a pH of 6. However, it is difficult to maintain this pH of 6 during dyeing; at a higher pH, the structure of the wool is damaged, while at a pH lower than 6 the wet fastness of the dyeings is markedly reduced. If, however, instead of using the β-sulfatoethylsulfonyl dyes, the vinylsulfonyl derivatives thereof are used, which can be obtained by the brief action of trisodium phosphate at 80° C. on the aqueous solution of the β-sulfatoethylsulfonyl dye followed by neutralization of the solution and adjustment to a pH of 5 using acetic acid, then here too it is possible to obtain wet fast dyeings on wool in a satisfactory manner at a pH of 5, as mentioned in U.S. Pat. No. 3,802,837. This method, however, has the considerable disadvantage that numerous dyes precipitate from the alkaline aqueous medium if the water-soluble β-sulfatoethylsulfonyl group is converted to the vinylsulfonyl group. Their solubility can be distinctly improved, in accordance with the above mentioned U.S. Pat. No. 3,802,837, if the conversion of the β-sulfatoethylsulfonyl dyes to the vinylsulfonyl dyes is carried out in the presence of a from 1.5-fold to 4-fold molar excess, based on the β-sulfatoethylsulfonyl group, of a secondary aliphatic amine which contains sulfo or carboxy groups.

When using this known procedure to dye synthetic polyamide fiber materials, a very slow rate of the dyebath exhaustion is observed, and a large percentage of dyebath exhaustion occurs only with prolonged dyeing periods at boil temperature. Furthermore, fixation of the dyes increases towards the end of this period. The dyebath remains to a great part unexhausted with portions of dyes being unfixed on the fibre. The result of all is that the dyeings obtained are weak in color, extremely unlevel and have inadequate fastness properties.

In order to avoid this disadvantage, attempts have been made (s. U.S. Pat. No. 4,762,524) to dye synthetic polyamide fiber materials with dyes containing the fiber-reactive groups of the vinylsulfone type in a weakly acidic dyebath at a pH of between 3 and 4, by using dyes having a β-sulfatoethylsulfonyl group together with a sulfo- or carboxy-containing secondary alkyl amine in a molar proportion of between 50 and 100%, based on the β-sulfatoethylsulfonyl dye, and treating these dyes initially in aqueous solution with an alkaline agent, such as trisodium phosphate, at a pH of about 9 and at a temperature of approximately 90° C., and, in so doing, partially converting the β-sulfatoethylsulfonyl dye to the β-(alkylamino) ethylsulfonyl dye. After adjusting the mixture to a pH of from 3 to 4, dyeing of the synthetic polyamide fiber material takes place at boiling temperature. With this procedure, however, the dyeings obtained are likewise of unsatisfactory levelness and exhibit distinct barriness and, in addition, inadequate penetration of the fiber material by the dye, if modern fiber materials are employed which contain fibers composed of extremely fine filaments. In this context, serious defects also arise in the case of continuous dyeing methods, where these known preparations give dyeings which vary in their depth of color at the beginning and at the end of the dyeing process.

There is therefore still a need to improve the dyeing of synthetic polyamide fiber materials.

With the present invention, it has now been found that synthetic polyamide fibers (nylon), in general an article having a nylon component, can be dyed in high brightness and levelness while avoiding the barre effect (s. Melliand Textilber. 70, 360–364 (1989)), if as a coloring agent a Dyeing Preparation (Composition) (A) or (B), defined below, and, as the nylon component, a fibre, such as a yarn, made from a nylon polymer having an amino end group content of at least 60 gram equivalents per 1000 kilograms of nylon polymer, are employed in the dyeing process.

The Dyeing Preparations (A) contain a dye of the general formula (1) given and defined below and a dye of the general formula (2) given and defined below which has a dye radical F which is identical to that of (1), or a mixture of different dyes of the formula (1), such as of two or three such dyes, and of different dyes of the formula (2), such as of two or three such dyes, having dye radicals F which are identical to those of (1), the dye or dyes of the formula (1) and the dye or dyes of the formula (2) in the preparation being present in a molar-equivalent ratio to one another, in terms of the groups —$(SO_2-CH=CH_2)_n$ and —$[SO_2-CH_2-CH_2-N(R)-V-X]_n$, of from 90:10% to 60:40%, preferably from 80:20% to 65:35%.

The Dyeing Preparations (B) contain one or more, such as two or three, dyes of the general formula (1A) given and defined below, and/or one or more, such as two or three, dyes of the general formula (1) and one or more, such as two or three, compounds of the general formula (3) given and defined below, the dye or dyes of the formula (1A) and (1) and, in relation to the β-sulfatoethylsulfonyl and vinylsulfonyl groups, the compound or compounds of the formula (3) being present in a molar-equivalent ratio to one another of from 100:10% to 100:40%, preferably from 100:20% to 100:35%.

The Preparations (B) preferably contain only one amino compound of the formula (3), and the Preparations (B) preferably contain as dyes one or more dyes of the formula (1A).

$$F-(SO_2-CH=CH_2)_n \qquad (1)$$

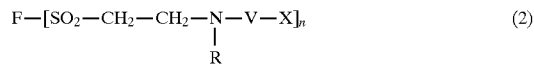
$$F-[SO_2-CH_2-CH_2-\underset{\underset{R}{|}}{N}-V-X]_n \qquad (2)$$

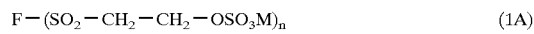
$$F-(SO_2-CH_2-CH_2-OSO_3M)_n \qquad (1A)$$

$$H-\underset{\underset{R}{|}}{N}-V-X \qquad (3)$$

In the above formulae:

F is the radical of a mono-, dis- or polyazo dye, such as a trisazo dye, or heavy metal complex mono-, dis- or trisazo dye or anthraquinone, azomethine, phenazine, stilbene, triphenylmethane, xanthene, thioxanthene, nitroaryl, naphthoquinone, perylenetetracarbimide, formazan, copper formazan, phthalocyanine, copper phthalocyanine, nickel phthalocyanine or cobalt phthalocyanine dye or triphendioxazine dye, which possesses 1 or 2 groups which impart water-solubility, such as sulfato, sulfo and/or carboxy groups, preferably 1 or 2 sulfo groups, particularly preferably 1 sulfo group;

n is the number 1 or 2, preferably 1;

M is hydrogen or an alkali metal, such as sodium, potassium or lithium;

R is hydrogen or alkyl of 1 to 6 carbon atoms, preferably of 1 to 4 carbon atoms, which can be interrupted by 1 or 2 hetero- group groups, such as groups of the formulae —O— and —NH—, and can be substituted by a substituent from the group consisting of sulfo, carboxy, hydroxy, sulfato, phosphato and alkanoylamino of 2 to 5 carbon atoms, but is preferably hydrogen and in particular preferably methyl, ethyl or β-hydroxyethyl;

V is a covalent bond or alkylene of 1 to 4 carbon atoms, such as methylene or ethylene, or a group of the formula —CO—NH—CH$_2$—CH$_2$—;

X is a group which imparts water-solubility, such as carboxy, sulfo, sulfato, phosphato or hydroxy.

Groups of the general formula —N(R)—V—X in the dyes of the general formula (2) are for example N-methyl-N-(β-sulfoethyl)-amino, N,N-di-(β-hydroxyethyl)-amino, N-methyl-N-(carboxymethyl)-amino, N-methyl-N-(γ-carboxypropyl)-amino, N-methyl-N-(β-carboxyethyl)-amino, N-methyl-N-(ω-carboxypentyl)-amino and N-ethyl-N-(γ-carboxypropyl)-amino.

Among the dye radicals F containing 1 or 2 sulfato, sulfo and/or carboxy groups, the radical F is preferably the radical of a mono- or disazo dye or of a heavy metal complex azo dye such as a 1:2 chromium complex, 1:2 cobalt complex and, in particular, of a o,o'-1:1 copper complex monoazo or disazo dye, or of an anthraquinone or copper formazan or nickel phthalocyanine or copper phthalocyanine dye or triphendioxazine dye.

The radical F may contain those substituents and groups which are conventional for organic dyes. Examples of such substituents and groups are: alkyl groups of 1 to 4 carbon atoms, such as methyl, ethyl, propyl, isopropyl and butyl, preferably ethyl and especially methyl; alkoxy groups of 1 to 4 carbon atoms, such as methoxy, ethoxy, propoxy, isopropoxy and butoxy, preferably ethoxy and especially methoxy; alkanoylamino groups of 2 to 5 carbon atoms, such as the acetylamino and propionylamino group; benzoylamino groups which can be substituted by methyl, ethyl, methoxy, ethoxy, chlorine and/or the groups already mentioned above which impart water-solubility; primary and mono- or disubstituted amino groups, the substituents being for example alkyl groups of 1 to 4 carbon atoms and/or phenyl groups, such as monoalkylamino and dialkylamino groups of 1 to 4 carbon atoms in the alkyl radical, phenylamino or N—(C$_1$–C$_4$-alkyl)-N-phenyl-amino groups, in which the alkyl radicals can also be substituted by, for example, phenyl and/or the groups already mentioned above which impart water-solubility, such as hydroxy, sulfato, sulfo and carboxy, or substituents containing such groups, such as sulfophenyl, and in which the phenyl groups can also be substituted, such as by chlorine, methyl, methoxy and/or the groups already mentioned above which impart water-solubility, or substituents containing such groups, for example methylamino, ethylamino, propylamino, isopropylamino, butylamino, N,N-di(β-hydroxyethyl)amino, N,N-di(β-sulfatoethyl)amino, sulfobenzylamino, N,N-di(sulfobenzyl)amino and diethylamino groups, and also phenylamino and sulfophenylamino groups; alkoxycarbonyl groups having an alkyl radical of 1 to 4 carbon atoms, such as methoxycarbonyl and ethoxycarbonyl; alkylsulfonyl groups of 1 to 4 carbon atoms, such as methylsulfonyl and ethylsulfonyl; trifluoromethyl, nitro and cyano groups; halogen atoms such as fluorine, chlorine and bromine; carbamoyl groups which can be mono- and disubstituted by alkyl of 1 to 4 carbon atoms in which the alkyl radicals can in turn be substituted by, for example, phenyl and/or the groups already mentioned above which impart water-solubility, such as hydroxy, sulfato, sulfo and carboxy, or substituents containing such groups, such as sulfophenyl, examples being N-methylcarbamoyl and N-ethylcarbamoyl; sulfamoyl groups which can be mono- or disubstituted by alkyl groups of 1 to 4 carbon atoms, and N-phenyl-N-alkysulfamoyl groups having an alkyl group of 1 to 4 carbon atoms, it being possible for these alkyl groups in turn to be substituted by phenyl and/or the groups already mentioned above which impart water-solubility, such as hydroxy, sulfato, sulfo and carboxy, or substituents containing such groups, such as sulfophenyl, examples being N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di(β-hydroxyethyl) sulfamoyl; N-phenylsulfamoyl, ureido, hydroxy and sulfomethyl groups.

The vinylsulfonyl and β-sulfatoethylsulfonyl groups which are present in the dyes of the formulae (1), (1A) and (2), and groups of the formula (3a) can be attached directly to an aromatic nucleus of the dye chromophore or to a substituent of the dye chromophore of the dye radical F.

Examples of further substituents in the radical F or groups contained in the radical F are groups of the formula (4) or (5)

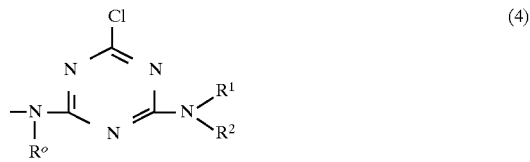

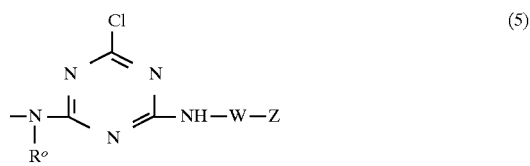

in which

R° is hydrogen or alkyl of 1 to 4 carbon atoms, such as methyl and ethyl,

R$^1$ is hydrogen or alkyl of 1 to 4 carbon atoms, such as ethyl and methyl, which can be substituted by alkanoyl of 2 to 5 carbon atoms and/or by the groups already mentioned above which impart water-solubility, such as carboxy, hydroxy, sulfo, sulfato and phosphato, R$^2$ has one of the meanings of R$^1$ or is cycloalkyl of 5 to 8 carbon atoms, such as cyclohexyl, or is phenyl which can be substituted by 1 or 2 substituents from the group consisting of alkyl of 1 to 4 carbon atoms, such as ethyl and methyl, alkoxy of 1 to 4 carbon atoms, such as ethoxy and methoxy, chlorine and/or the groups already mentioned above which impart water-solubility, such as sulfo and carboxy, or the group —NR$^1$R$^2$ is the radical of a saturated heterocycle of 5 to 8 carbon atoms which may also contain 1 or 2 further hetero-groups, such as groups of the formulae —O— and —NH—, such as the N-morpholino, N-piperidino or N-piperazino radical, W is phenylene or alkylene of 2 to 4 carbon atoms, such as ethylene and n-propylene, or is alkylene of 3 to 8 carbon atoms, preferably of 4 to 6 carbon atoms, which can be interrupted by 1 or 2 hetero-groups, such as groups of the formulae —O— and —NH—, examples being ethyleneoxyethylene or ethyleneaminoethylene, or alkylenephenylene having an alkylene radical of 1 to 4 carbon atoms or phenylenealkylene having an alkylene radical of 1 to 4 carbon atoms such as ethylene and propylene, or phenylenealkylene having an alkylene radical of 3 to 8 carbon atoms, preferably of 4 to 6 carbon atoms, which can be interrupted by one or two hetero-groups such as groups of the formulae —O— and —NH—, or is $(C_1-C_4)$-alkylene-phenylene-$(C_1-C_4)$-alkylene, in which case the phenylene radicals indicated here can additionally be substituted by 1 or 2 substituents from the group consisting of alkyl of 1 to 4 carbon atoms, such as ethyl and methyl, and alkoxy of 1 to 4 carbon atoms, such as ethoxy and methoxy, and/or the groups already mentioned above which impart water-solubility, such as sulfo and carboxy, and Z is the vinylsulfonyl or β-sulfatoethylsulfonyl group indicated in formulae (1), (1A) and (2) or is the group of the formula (3a)

$$-SO_2-CH_2-CH_2-\underset{R}{N}-V-X \qquad (3a)$$

where R, V and X are as defined above.

In the formulae given above and below, the individual constituents of the formulae, both where they have different designations and where they have the same designation within a formula, can within the scope of their definition have meanings which are the same as or different from one another.

References to the groups "sulfo", "carboxy", "phosphato" and "sulfato" include both their acid form and their salt form. Accordingly, sulfo groups are groups of the formula —$SO_3M$, carboxy groups are groups of the formula —COOM, phosphato groups are groups of the formula —$OPO_3M_2$ and sulfato groups are groups of the formula —$OSO_3M$, in which M is as defined above.

Examples of preferred mono- and disazo dyes of the formula (1) are those of the formulae (6a), (6b) and (6c)

$$D^1-N=N-(E-N=N)_v-K^2-Z \qquad (6a)$$

$$Z-D^2-N=N-(E-N=N)_v-K^1 \qquad (6b)$$

$$Z-D^2-N=N-(E-N=N)_v-K^2-Z \qquad (6c)$$

and the heavy metal complex compounds which are derived therefrom, such as 1:1 copper complex compounds, for example dyes of the formulae (6d) and (6e)

$$D^3-N=N-K^3-(N=N-K^2)_v-Z \qquad (6d)$$ (with Cu–O,O bridge)

$$Z-D^4-N=N-K^3-(N=N-K)_v-H \qquad (6e)$$ (with Cu–O,O bridge)

in which
$D^1$, $D^2$, $D^3$, $D^4$, E, $K^1$, $K^2$ and $K^3$ are as defined above and
K is the bivalent radical of a coupling component,
but the radicals $D^1$, $D^2$, $D^3$, $D^4$, $K^1$, $K^2$, $K^3$ and K in the respective dye do not contain more than 1 or 2 of the abovementioned sulfato, sulfo and/or carboxy groups which impart water-solubility, and preferably together contain 1 or 2 sulfo groups, particularly preferably 1 sulfo group, v is the number zero or 1, and
Z is vinylsulfonyl, β-sulfatoethylsulfonyl or a group of the formula (3a).

Preferred dyes of the formula (1) are, furthermore, disazo dyes of the formula (6f)

$$\left[ \begin{array}{c} \text{HO} \quad \text{NH}_2 \\ D-N=N-\text{naphthalene}-N=N-D \\ MO_3S \quad\quad SO_3M \end{array} \right]-Z_n \qquad (6f)$$

in which M, n and Z are as defined above and D in each case has the meaning of $D^1$ or $D^2$, depending on whether the radical Z is attached to D.

Radicals $D^1$ and Z—$D^2$— which are a constituent of aromatic amines which can possess the function of a diazo component are those of the formula (7a) and (7b)

$$\begin{array}{c} P^1 \\ R^G-\text{phenyl} \\ P^2 \end{array} \qquad (7a)$$

$$R^G-\text{naphthyl}-(SO_3M)_m \qquad (7b)$$

and radicals $D^3$ and Z—$D^4$— are those of the formulae (8a) and (8b)

$$\begin{array}{c} P^1 \\ R^G-\text{phenyl} \\ P^2 \end{array} \qquad (8a)$$

$$R^G-\text{naphthyl}-(SO_3M)_m \qquad (8b)$$

in which
$R^G$ is hydrogen, sulfo, carboxy or a group of the formula Y—$SO_2$—$W^\circ$— or $Y^\circ$—$SO_2$—$W^\circ$—
in which
Y is vinyl or β-sulfatoethyl,
$Y^\circ$ is a group of the formula (3b)

$$-CH_2-CH_2-\underset{R}{N}-V-X \qquad (3b)$$

where R, V and X are as defined above, and
$W^\circ$ is a covalent bond or alkylene of 1 to 4 carbon atoms, such as methylene, ethylene and n-propylene, or alkylene of 3 to 8 carbon atoms, preferably of 4 to 6 carbon atoms, which is interrupted by 1 or 2 hetero-groups selected from the groups —O— and —NH—, or is phenylenemethylene or phenyleneethylene, $P^1$ is hydrogen, sulfo, methyl, ethyl, methoxy, ethoxy, alkanoyl of 2 to 5 carbon atoms, such as acetyl and propionyl, cyano, alkoxycarbonyl of 2 to 5 carbon atoms, such as methoxycarbonyl and ethoxycarbonyl, carbamoyl, N-($C_1$–$C_4$-alkyl)carbamoyl, fluorine, chlorine, bromine or trifluoromethyl, $P^2$ is hydrogen, methyl, ethyl, methoxy, ethoxy, cyano, nitro, chlorine, alkanoylamino of 2 to 5 carbon atoms, such as acetylamino, alkoxycarbonyl of 2 to 5 carbon atoms, such as methoxycarbonyl and ethoxycarbonyl, carbamoyl, N-($C_1$–$C_4$-alkyl)sulfamoyl, sulfophenylamidocarbonyl, phenylamidocarbonyl, alkylsulfonyl of 1 to 4 carbon atoms, phenylsulfonyl or phenoxy, m is the number zero, 1 or 2 (and if m is zero this group is a hydrogen atom), M is as defined above, and the benzene ring in formula (7a) and (7b) can additionally contain a hydroxy group in the ortho-position to the free bond which leads to the azo group.

Among these definitions, $P^1$ is preferably hydrogen, sulfo, methyl, methoxy, bromine or chlorine and $P^2$ is preferably hydrogen, methyl, methoxy and acetylamino.

Groups Z—$D^2$— are in addition those which are derived from a diaminobenzene or diaminonaphthalene compound and are of the formulae (9a) and (9b)

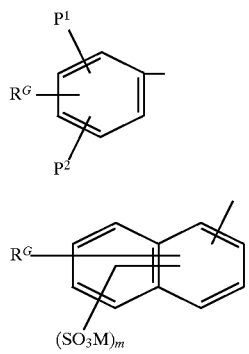

in which $P^1$, $P^2$, M and m are as defined above and $R^B$ is a group of the formula (4) or (5) mentioned and defined above.

Radicals E, as constituent of a couplable and diazotizable aromatic amino compound of the formula H—E—$NH_2$, are those of the formulae (10a), (10b), and (10c)

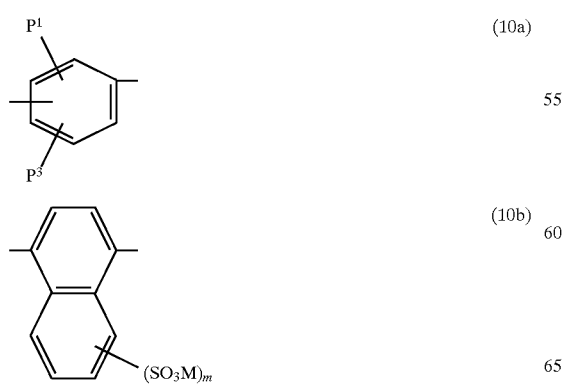

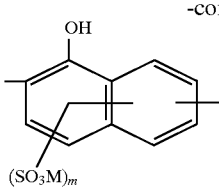

in which $P^1$, M and m are as defined above and $P^3$ is hydrogen, alkyl of 1 to 4 carbon atoms, such as methyl or ethyl, alkoxy of 1 to 4 carbon atoms, such as methoxy and ethoxy, chlorine, alkanoylamino of 2 to 5 carbon atoms, such as acetylamino and propionylamino, benzoylamino, ureido, phenylureido, alkylureido having 1 to 4 carbon atoms in the alkyl radical, phenylsulfonyl or alkylsulfonyl of 1 to 4 carbon atoms.

Examples of groups of the formulae (7a) and (7b) without a group of the formula —$SO_2$—Y or —$SO_2$—$Y°$ are:

phenyl, 2-methylphenyl, 3- and 4-methylphenyl, 2-methoxyphenyl, 3- and 4-methoxyphenyl, 2-chlorophenyl, 3- and 4-chlorophenyl, 2,5-dichlorophenyl, 2,5-dimethylphenyl, 2-methoxy-5-methylphenyl, 2-methoxy-4-nitro-phenyl, 4-phenylphen-1-yl, 3-phenoxyphenyl, 2-sulfamoylphenyl, 3- and 4-sulfamoylphenyl, 2-, 3- and 4-(N-methylsulfamoyl)-, -(N-ethylsulfamoyl)-, -(N,N-dimethylsulfamoyl)- and -N,N-diethylsulfamoyl)phenyl, 2-sulfo-5-trifluoromethylphenyl, 2-nitrophenyl, 3- and 4-nitrophenyl, 3-acetylaminophenyl, 4-acetylaminophenyl, 2-carboxyphenyl, 4-carboxyphenyl, 3-carboxyphenyl, 3-chloro-6-carboxyphenyl, 2-sulfophenyl, 3-sulfophenyl, 4-sulfophenyl, 2,5-disulfophenyl, 2,4-disulfophenyl, 3,5-disulfophenyl, 2-methyl-5-sulfophenyl, 2-methoxy-5-sulfo-phenyl, 2-methoxy-4-sulfophenyl, 2-sulfo-5-methylphenyl, 2-methyl-4-sulfophenyl, 3-sulfo-4-methoxyphenyl, 5-sulfo-2-ethoxyphenyl, 4-sulfo-2-ethoxyphenyl, 2-carboxy-5-sulfophenyl, 2-carboxy-4-sulfophenyl, 2,5-dimethoxy-4-sulfophenyl, 2,4-dimethoxy-5-sulfophenyl, 2-methoxy-5-methyl-4-sulfophenyl, 2-sulfo-4-methoxyphenyl, 2-sulfo-4-methylphenyl, 2-methyl-4-sulfophenyl, 2-chloro-4-sulfophenyl, 2-chloro-5-sulfophenyl, 2-bromo-4-sulfophenyl, 2,6-dichloro-4-sulfophenyl, 2-sulfo-4- and -5-chlorophenyl, 2-sulfo-4,5-dichlorophenyl, 2,5-dichloro-6-sulfophenyl, 2,5-dichloro-4-sulfophenyl, 2-sulfo-5-chloro-4-methylphenyl, 2-sulfo-4-chloro-5-methylphenyl, 2-sulfo-5-methoxyphenyl, 2-methoxy-5-sulfophenyl, 2-methoxy-4-sulfophenyl, 2,4-dimethoxy-6-sulfophenyl, 2-sulfo-5-acetylamino-4-methylphenyl, 2-methyl-4,6-disulfo-phenyl, 2,5-disulfo-4-methoxyphenyl, 2-sulfo-5-nitrophenyl, 2-sulfo-4-nitrophenyl, 2,6-dimethyl-3-sulfo-phenyl, 2,6-dimethyl-4-sulfophenyl, 3-acetylamino-6-sulfophenyl, 4-acetylamino-2-sulfophenyl, 4-sulfonaphth-1-yl, 3-sulfonaphth-1-yl, 5-sulfonaphth-1-yl, 6-sulfonaphth-1-yl, 7-sulfonaphth-1-yl, 8-sulfonaphth-1-yl, 3,6-disulfo- and 5,7-disulfonaphth-1-yl, 3,7-disulfonaphth-1-yl, 5-sulfonaphth-2-yl, 6- or 8-sulfonaphth-2-yl, 1,7-disulfonaphth-2-yl, 5,7-disulfonaphth-2-yl, 6,8-disulfonaphth-2-yl, 1,6-disulfonaphth-2-yl, 1-sulfonaphth-2-yl, 1,5-disulfonaphth-2-yl, 3,6-disulfonaphth-2-yl, 4,8-disulfonaphth-2-yl, 2-hydroxy- 5-sulfophenyl, 2-hydroxy-4-sulfophenyl, 2-hydroxy-3,5-disulfophenyl, 2-hydroxy-5-acetylamino-3-sulfophenyl, 2-hydroxy-3-acetylamino-4-sulfophenyl, 2-hydroxy-5-chloro-4-sulfophenyl, 2-hydroxy-5-methylsulfonylphenyl, 2-hydroxy-6-nitro-4-sulfonaphth-1-yl and 1-hydroxy-4,8-disulfonaphth-2-yl.

Examples of groups of the formulae (7a) and (7b) with a group of the formula —SO$_2$—Y or —SO$_2$—Y$^o$ are:
2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-3-(sulfatoethylsulfonyl)phenyl, 2-chloro-4-(β-sulfatoethylsulfonyl)phenyl, 2-bromo-4-(β-sulfatoethylsulfonyl)phenyl, 4-methoxy-3-(β-sulfatoethylsulfonyl)phenyl, 4-chloro-3-(β-sulfatoethylsulfonyl)phenyl, 2-ethoxy-4- or 5-(β-sulfatoethylsulfonyl)phenyl, 2-methyl-4-(β-sulfatoethylsulfonyl)phenyl, 2-methoxy-5- or -4-(β-sulfatoethylsulfonyl)phenyl, 2,4-diethoxy-5-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2-sulfo-4-vinylsulfonylphenyl, 2-hydroxy-4- or -5-(β-sulfatoethylsulfonyl)phenyl, 2-hydroxy-5-(β-sulfatoethylsulfonyl)phenyl, 2-hydroxy-3-sulfo-5-(β-sulfatoethylsulfonyl)phenyl, 6-carboxy-1-sulfonaphth-2-yl, 5-(β-sulfatoethylsulfonyl)naphth-2-yl, 6- or 7- or 8-(β-sulfatoethylsulfonyl)naphth-2-yl, 6-(β-sulfatoethylsulfonyl)-1-sulfonaphth-2-yl, 5-(β-sulfatoethylsulfonyl)-1-sulfonaphth-2-yl, 8-(β-sulfatoethylsulfonyl)-6-sulfonaphth-2-yl, 4-[β-(β'-sulfatoethylsulfonyl)ethyl]phenyl, 3- or 4-[β-(β'-sulfatoethylsulfonyl)ethylamino]phenyl, 3- or 4-[γ-(vinylsulfonyl)propylamino]phenyl, 4-[β-(β'-sulfatoethylsulfonyl)ethylamino]-2- or -3-sulfophenyl, 4-[γ-(β'-sulfatoethylsulfonyl)propylamino]-2- or -3-sulfophenyl, 4-[γ-(β'-sulfatoethylsulfonyl)ethylamino]-2-carboxyphenyl and 4-[γ-(β'-sulfatoethylsulfonyl)propylamino]-2-carboxyphenyl, and also amino derivatives thereof which possess instead of the β-sulfatoethylsulfonyl group or vinylsulfonyl group an ethylsulfonyl group which is substituted by the alkylamino group of the formula (3a), such as, for example, a β-[N-methyl-N-(β'-sulfoethyl)-amino]-ethylsulfonyl, β-[N-methyl -N-(β'-carboxyethyl)-amino]-ethylsulfonyl or β-[N,N-di-(β'-hydroxyethyl)amino]ethylsulfonyl group.

Examples of groups of the part-formulae D$^1$—N═N—E— and Z—D$^2$—N═N—E— are 4-(4'-sulfophenyl)azo-2-sulfophenyl, 4-(2',4'-disulfophenyl)azo-2-methoxy-5-methylphenyl, 4-(2',5'-disulfophenyl)azo-2-methyl-5-methoxyphenyl, 4-(4',8'-disulfonaphth-2'-yl)azo-3-acetylaminophenyl, 4-(4'-sulfophenyl)azo-6-sulfonaphth-1-yl, 4-[4'-(β-sulfatoethylsulfonyl)phenyl]azo-2-methyl-5-methoxyphenyl, 4-[3'-(β'-sulfatoethylsulfonyl)phenyl]azo-3-methylphenyl, 4-[4'-(β-sulfatoethylsulfonyl)phenyl]azo-3-ureidophenyl, 4-[6'-(β-sulfatoethylsulfonyl)naphth-2'-yl]azo-3-ureido-phenyl and 7-[2'-methoxy-5'-(β-sulfatoethylsulfonyl)-phenyl]azo-8-hydroxy-6-sulfonaphth-3-yl.

Examples of diaminobenzene and diaminonaphthalene compounds which are part or a constituent of groups of the formulae (9a) and (9b) are 1,4-phenylenediamine, 2-sulfo-1,4-phenylenediamine, 2-carboxy-1,4-phenylenediamine, 2-sulfo-1,4-diaminonaphthalene, 8-sulfo-2,6-diaminonaphthalene, 1,3-phenylenediamine, 4-sulfo-1,3-phenylenediamine and 6-sulfo-1,4-diaminonaphthalene.

Examples of groups of the formulae (10a), (10b) and (10c) are 3-methyl-1,4-phenylene, 3-methoxy-1,4-phenylene, 2-methoxy-5-methyl-1,4-phenylene, 2,5-dimethyl-1,4-phenylene, 3-ureido-1,4-phenylene, 3-ureido-1,4-phenylene, 3-acetylamino-1,4-phenylene, 3-propionylamino-1,4-phenylene, 3-butyrylamino-1,4-phenylene, 2-methyl-5-acetylamino-1,4-phenylene, 2-methoxy-5-acetylamino-1,4-phenylene and 2-sulfo-5-amino-1,4-phenylene, where the 4-position in the phenylene radical is connected to the azo group to give the radical D$^1$ or D$^2$ and also 6-sulfo-, 7-sulfo- and 8-sulfonaphth-4,1-ylene, whose 4-position is attached to the azo group of the radical E, and 8-hydroxy-6-sulfonaphth-7,2-ylene, 8-hydroxy-6-sulfo-naphth-7,3-ylene and 8-hydroxy-4,6-disulfonaphth-7,3-ylene, where the 7-position is connected to the azo group to form the radical E.

Radicals K$^1$ and —K$^2$—Z as constituent of a coupling component of the formula H—K$^1$ or H—K$^2$—Z are those of the formulae (11a) to (11k)

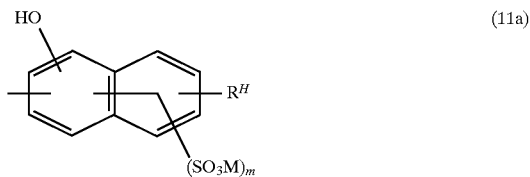
(11a)

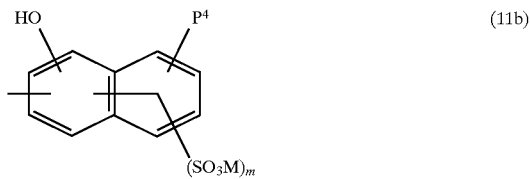
(11b)

(11c)

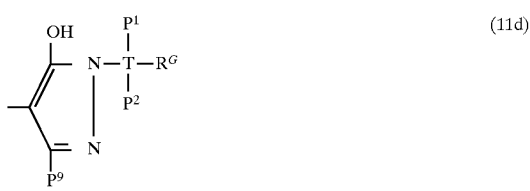
(11d)

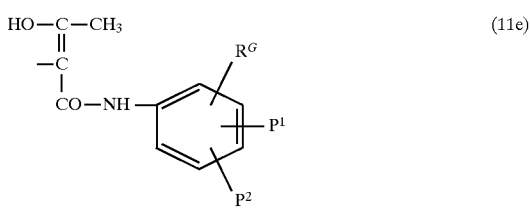
(11e)

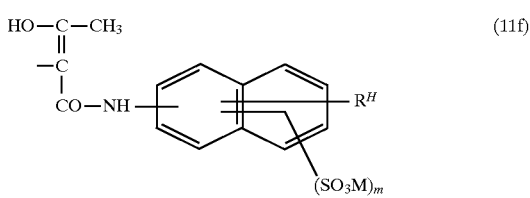
(11f)

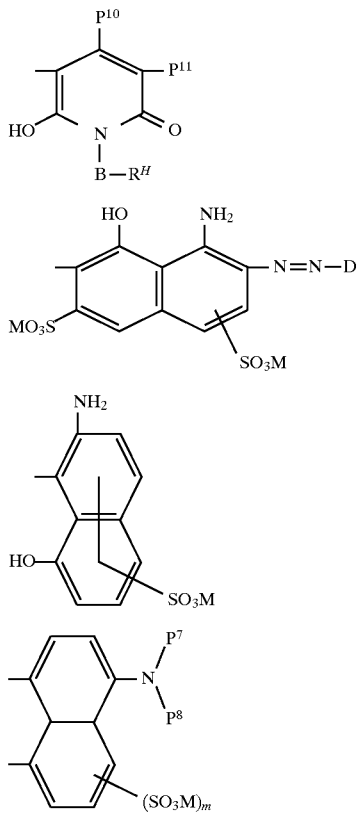

in which
- $R^G$, $P^1$, $P^2$, m and M are as defined above,
- $R^H$ is hydrogen or a group of the above-defined formula —$W^o$—$SO_2$—Y or —$W^o SO_2$—$Y^o$ or a group of the formula (4) or (5),
- $P^4$ is alkanoylamino of 2 to 5 carbon atoms, such as propionylamino and, in particular, acetylamino, or phenylureido which can be substituted in the phenyl radical by substituents from the group consisting of chlorine, methyl, methoxy, sulfo and carboxy and/or by a group —$W^o$—$SO_2$—Y or —$W^o$—$SO_2$—$Y^o$ where Y, $Y^o$ and $W^o$ are as defined above, or by a group of the formula (4) or (5), or is benzoylamino which can be substituted in the phenyl radical by substituents from the group consisting of chlorine, methyl, methoxy, nitro, sulfo and carboxy and/or by a group —$W^o SO_2$—Y or —$W^o$—$SO_2$—$Y^o$ as defined above, or by a group of the formula (4) or (5),
- $P^5$ is hydrogen, alkyl of 1 to 4 carbon atoms, such as methyl and ethyl, alkoxy of 1 to 4 carbon atoms, such as methoxy and ethoxy, bromine, chlorine or sulfo,
- $P^6$ is hydrogen, alkyl of 1 to 4 carbon atoms, such as methyl and ethyl, alkoxy of 1 to 4 carbon atoms, such as methoxy and ethoxy, chlorine, alkanoylamino of 2 to 7 carbon atoms, such as acetylamino and propionylamino, ureido or phenylureido,
- $P^7$ is hydrogen or alkyl of 1 to 4 carbon atoms which can be substituted by hydroxy, cyano, carboxy, sulfo, sulfato, methoxycarbonyl, ethoxycarbonyl or acetoxy,
- $P^8$ is hydrogen, alkyl of 1 to 4 carbon atoms which can be substituted by hydroxy, cyano, carboxy, sulfo, sulfato, methoxycarbonyl, ethoxycarbonyl or acetoxy, or is benzyl or phenyl which can be substituted by alkyl of 1 to 4 carbon atoms, alkoxy of 1 to 4 carbon atoms, chlorine and/or by a group —$W^o$—$SO_2$—Y or —$W^o$—$SO_2$—$Y^o$ as defined above or by a group of the formula (4) or (5),
- $P^9$ is hydrogen, alkyl of 1 to 4 carbon atoms, such as methyl, cyano, carboxy, carbalkoxy of 2 to 5 carbon atoms, such as carbomethoxy and carboethoxy, carbamoyl, phenyl or sulfophenyl, preferably methyl, carboxy, methoxycarbonyl, ethoxycarbonyl or phenyl and, in particular, methyl or carboxy,
- T is a benzene or naphthalene ring, preferably a benzene ring,
- $P^{10}$ is hydrogen or alkyl of 1 to 4 carbon atoms, such as methyl, or alkyl of 1 to 4 carbon atoms which is substituted by alkoxy of 1 to 4 carbon atoms, such as methoxy, or by cyano, or is phenyl, preferably alkyl of 1 to 4 carbon atoms or phenyl,
- $P^{11}$ is hydrogen, chlorine, bromine, sulfo, carbamoyl, methylsulfonyl, phenylsulphonyl, cyano or sulfoalkyl of 1 to 4 carbon atoms, preferably hydrogen, sulfo, sulfoalkyl having an alkyl radical of 1 to 4 carbon atoms, such as sulfomethyl, cyano or carbamoyl,
- B is alkylene of 1 to 4 carbon atoms which can be substituted by sulfo, hydroxy, phosphato, sulfato and carboxy, or is methylenephenylene, ethylenephenylene, phenylenemethylene, phenyleneethylene or phenylene, or is methylenephenylene, ethylenephenylene or phenylene which is substituted in the benzene radical by fluorine, chlorine, bromine, methyl, methoxy, cyano, sulfo, carboxy, acetyl, nitro, carbamoyl and/or sulfamoyl, or the radical —B—$R^G$ is hydrogen, and
- D is a radical of the formula (7a), (7b), (9a) or (9b).

Radicals —$K^1$ and —$K^2$—Z are, in addition, groups of the formulae (12a) to (12h)

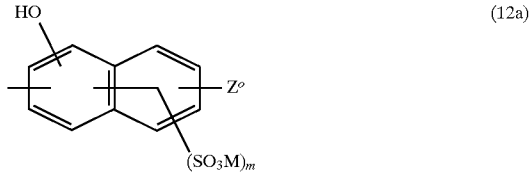

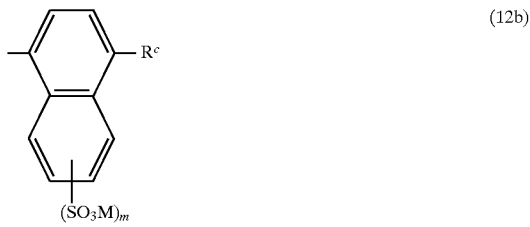

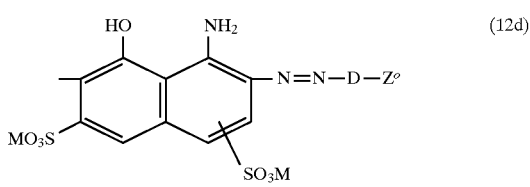

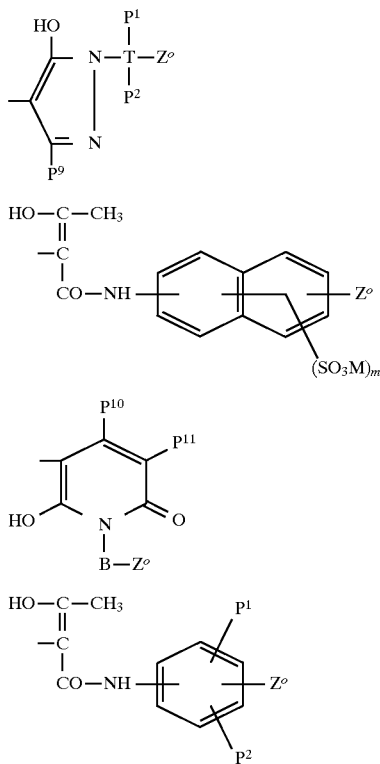

(12e)

(12f)

(12g)

(12h)

in which P¹, P², P⁹, P¹⁰, P¹¹, B, T, M, m and D have the meanings given above, especially the preferred meanings, and Z° is hydrogen in the case of K¹, and in the case of K² the radical Z indicated therein is as defined above or is a group of the formula (4) or (5), and $R^C$ is amino or a group of the formula (4) or (5).

The radical —K—H in formula (6e) has one of the meanings of the radical K¹ as defined above or is a radical of the formula (11b), (11c) or (11k) which is free of groups of the formulae —W°—SO₂—Y, —W°—SO₂—Y° or (4) or (5), or is a radical of the formula (12b) or (12c) where $R^C$ is amino.

In the above formulae (11a), (11b) and (12a) the free bond leading to the azo group is attached to the aromatic nucleus in the ortho-position with respect to the hydroxy group.

Examples of groups K¹ of the formulae (11) and (12) are 1-hydroxynaphth-2-yl, 2-hydroxynaphth-1-yl, 6- and 7-sulfo-2-hydroxynaphth-1-yl, 2-hydroxy-3,6-disulfonaphth-1-yl, 2-hydroxy-6,8-disulfonaphth-1-yl, 4-sulfo-1-hydroxynaphth-2-yl, 4,6-disulfo- and 4,7-disulfo-1-hydroxynaphth-2-yl, 1-amino-3-methylphen-4-yl, 1-amino-2-methoxy-5-methylphen-4-yl, 2,5-dimethyl-1-aminophen-4-yl, 3-ureido-1-aminophen-4-yl, 3-acetylamino-1-aminophen-4-yl, 6-sulfo-1,3-diaminophen-4-yl, 1-aminonaphth-4-yl, 1-amino-6-sulfonaphth-4-yl, 1-amino-8-sulfonaphth-4-yl, 2-amino-5,7-disulfonaphth-1-yl, 1-amino-8-hydroxy-6-sulfo-naphth-7-yl, 1-amino-8-hydroxy-6-sulfonaphth-2-yl, 1-amino-8-hydroxy-2,4-disulfonaphth-7-yl, 1-hydroxy-8-acetylamino-3-sulfonaphth-2-yl, 1-benzoylamino-8-hydroxy-3,6-und -4,6-disulfonaphth-7-yl, 3-benzoylamino-8-hydroxy-6-sulfonaphth-7-yl, 3-amino-8-hydroxy-6-sulfo-naphth-7-yl, 3-acetylamino-8-hydroxy-6-sulfonaphth-7-yl, 3-amino-4,6-disulfo-8-hydroxynaphth-7-yl, 2-amino- 8-hydroxy-6-sulfonaphth-7-yl, 2-acetylamino-8-hydroxy-6-sulfonaphth-7-yl, 2-amino-8-hydroxy-3,6-disulfonaphth-7-yl, 2-acetylamino-8-hydroxy-3,6-disulfonaphth-7-yl, 4-amino-8-hydroxy-6-sulfonaphth-7-yl, 1-amino-8-hydroxy-3,6- and -4,6-disulfonaphth-7-yl, 1-amino-8-hydroxy-3,6- and -4,6-disulfonaphth-2-yl, 1-acetylamino-8-hydroxy-3,6- and -4,6-disulfonaphth-2-yl, 1-(4'-aminobenzoyl)-8-hydroxy-3,6- and -4,6-disulfonaphth-7-yl, 1-(3'-aminobenzoyl)-8-hydroxy-3,6- and -4,6-disulfonaphth-7-yl, 1-phenyl-3-methyl-5-hydroxypyrazol-4-yl, 1-(4'-sulfophenyl)-3-methyl-5-hydroxypyrazol-4-y, 1-(4'-sulfophenyl-3)carboxy-5-hydroxypyrazol-4-yl, 1-(2',5'-disulfophenyl)-3-methyl-5-hydroxypyrazol-4-yl, 1-(2'-methyl-4'-sulfophenyl)-3-carboxy-5-hydroxypyrazol-4-yl, 1-(4',8'-disulfonaphth-2'-yl)-3-methyl-5-hydroxypyrazol-4-yl, 1-(5',7'-disulfonaphth-2'-yl)-3-methyl-5-hydroxy-pyrazol-4-yl, 1-(2',5'-dichloro-4'-sulfophenyl)-3-methyl-5-hydroxypyrazol-4-yl, 4-methyl-6-hydroxypyrido-2-on-3-yl, 1-N-ethyl-3-cyano-4-methyl-6-hydroxypyrid-2-on-4-yl, 1-N-ethyl-3-sulfomethyl-4-methyl-6-hydroxypyrid-2-on-4-yl, 1-N-ethyl-3-carbamoyl-4-methyl-6-hydroxypyrid-2-on-4-yl, 1-(2'-methoxy-5'-sulfophenylaminocarbonyl)-2-oxo-prop-1-yl, 1-(2'-methoxy-5'-methyl-4'-sulfophenylaminocarbonyl)-2-oxoprop-1-yl, 1-amino-8-hydroxy-7-(4'-sulfophenylazo)-3, 6-disulfonaphth-7-yl, 1-amino-8-hydroxy-7-(2',5'-disulfophenylazo)-3,6-disulfonaphth-7-yl and 2-hydroxy-6-carboxynaphth-1-yl, in which radicals any amino group present can be replaced by a group of the formula (3a) where R° is preferably hydrogen, and also 1-[4'-(β-sulfatoethylsulfonyl)phenyl]-3-methyl-5-hydroxypyrazol-4-yl, 1-[2'-methoxy-5'-methyl-4'-(β-sulfatoethylsulfonyl)phenyl]-3-methyl-5-hydroxypyrazol-4-yl, 1-[2'-methoxy-5'-methyl-4'-(β-sulfatoethylsulfonyl)phenylaminocarbonyl]-2-oxoprop-1-yl and 1-amino-8-hydroxy-7-[4'-(β-sulfatoethylsulfonyl)phenylazo]-3,6-disulfonaphth-2-yl, and, in addition, radicals of the type just mentioned in which the β-sulfatoethylsulfonyl group is replaced by the vinylsulfonyl group or by a sulfonyl group of the formula (3a), for example by the β-[N-methyl-N-(β'-sulfoethyl)amino] ethylsulfonyl or β-(N-methyl-N-carboxymethyl ethylsulfonyl group.

Radicals K³ in the formulae (6d) and (6e) with a metal complex-binding oxygen atom are, in particular, those of the formulae (13a) to (13e)

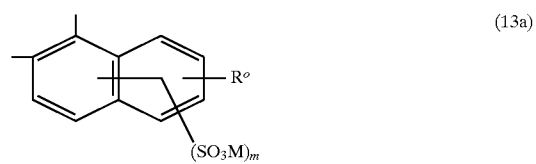

(13a)

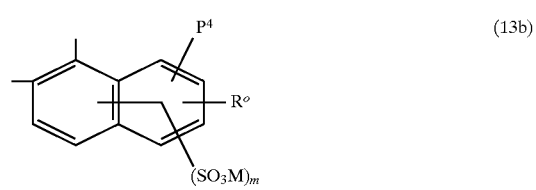

(13b)

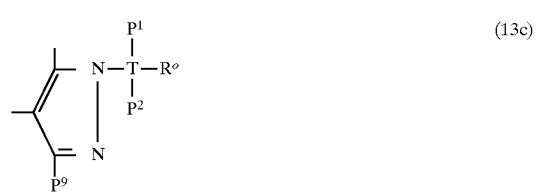

(13c)

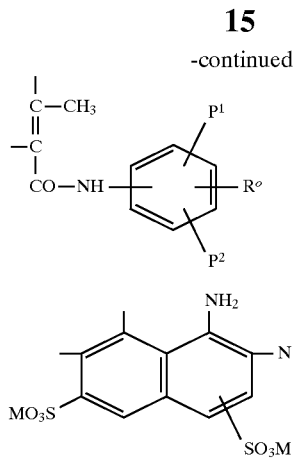

(13d)

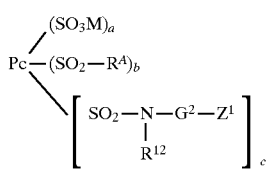

(13e)

in which the individual constituents of the formulae are as defined above, $R^D$ is a radical Z or a radical $R^B$ as defined above, and $R^E$ is a radical $R^B$ or $R^H$ as defined above.

Examples of phthalocyanine dyes are those of the formula (14)

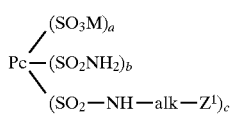

(14)

in which:

$P^C$ is the radical of a nickel or, preferably, copper phthalocyanine;

$R^A$ is an amino group of the formula $-NR^{13}R^{14}$ in which $R^{13}$ and $R^{14}$ independently of one another are hydrogen or alkyl of 1 to 4 carbon atoms which can be substituted by hydroxy or sulfo, or is a heterocyclic N-containing radical such as the morpholino or piperidino radical;

$R^{12}$ is hydrogen or alkyl of 1 to 4 carbon atoms, such as methyl and ethyl;

$G^2$ is phenylene which can be substituted by 1 or 2 substituents from the group consisting of alkyl of 1 to 4 carbon atoms, such as ethyl and methyl, halogen, such as chlorine and bromine, carboxy and sulfo, for example sulfophenylene, or is alkylene of 2 to 6 carbon atoms, such as ethylene;

a is a number from zero to 2, b is a number from zero to 3, and c is a number from 1 to 2, the sum of (a+b+c) being a number from 2 to 4;

$Z^1$ is vinylsulfonyl, β-sulfatoethylsulfonyl or a group of the formula (3a) or (5).

Phthalocyanine dyes are in particular those of the formulae (14a) and (14b)

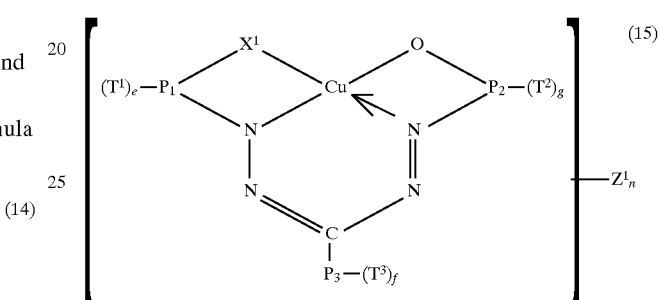

(14a)

(14b)

in which M and $Z^1$ are as defined above, a is a number from 1 to 2, b is a number from 0 to 2 and c is a number from 1 to 2, the sum of (a+b+c) being a number from 2 to 4, Pc is the radical of a nickel or, preferably, copper phthalocyanine, and alk is alkylene of 2 to 4 carbon atoms, preferably ethylene.

Copper formazan dyes are, for example, those of the formula (15)

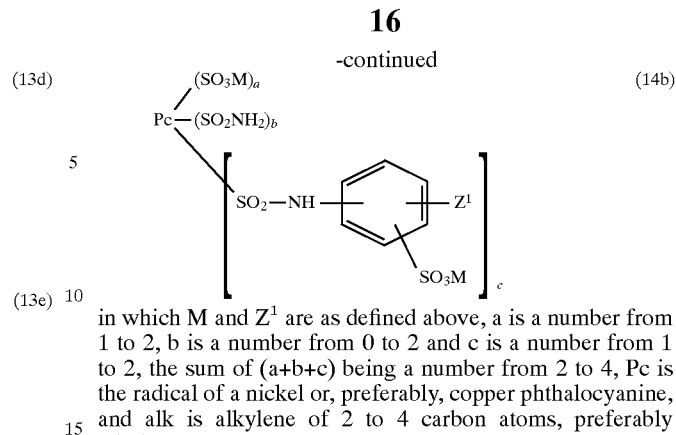

(15)

in which:

$Z^1$ and n are as defined above;

$X^1$ is an oxygen atom or, preferably, the carbonyloxy group of the formula —COO—;

$P_1$ and $P_2$ are each independently of the other a benzene or naphthalene ring in which, on $P_1$, the nitrogen atom and the group $X_1$ are ortho to one another and, on $P_2$, the oxygen atom and the nitrogen atom are ortho to one another, and the benzene or naphthalene nuclei can also be substituted by one or two substitutents from the group consisting of halogen, such as chloro, nitro, alkyl of 1 to 4 carbon atoms, such as methyl and ethyl, alkoxy of 1 to 4 carbon atoms, such as methoxy and ethoxy, sulfamoyl, sulfamoyl which is mono- or disubstituted by alkyl of 1 to 4 carbon atoms, alkylsulfonyl of 1 to 4 carbon atoms, such as methylsulfonyl and ethylsulfonyl, and phenylsulfonyl, and where both $P_1$ and $P_2$ are preferably a benzene ring;

$P_3$ is a straight-chain or branched alkylene group of 2 to 6 carbon atoms, preferably of 2 to 4 carbon atoms, which can be substituted by a sulfophenyl group, or is a phenylene group or a naphthylene group which can be substituted by 1 or 2 substituents from the group consisting of methyl, ethyl, methoxy, ethoxy and chlorine, and $P_3$ is preferably a benzene ring;

$T^1$, $T^2$ and $T^3$ are each independently of one another sulfo or carboxy, preferably sulfo;

e, f and g are each independently of one another the number zero, 1 or 2, the sum of (e+f+g) being an integer from 1 to 4 and preferably being 2 or 3, especially 2, and if e or f or g is zero the group $T^1$ or $T^2$ or $T^3$, respectively, is a hydrogen atom; and the group $Z^1$ is attached to an aromatic radical of $P_1$, $P_2$ or $P_3$, preferably to $P_2$.

Copper formazan dyes are particularly those in which $P_1$ and $P_2$ are both a benzene ring, the group $Z^1$ is attached to $P_2$, and $T^1$ and $T^2$ are each a sulfo group, where e and g are both 1.

If the group $Z^1$ is attached to $P_1$, e is the number zero, g is the number 2 and $T^2$ is a sulfo group. Preferably, in addition, the group —$P_3$—$(T^3)_f$ is the phenyl radical or a 2- or 4-sulfophenyl radical.

Among the copper formazan dyes, particular emphasis is to be placed on those of the formula (15a)

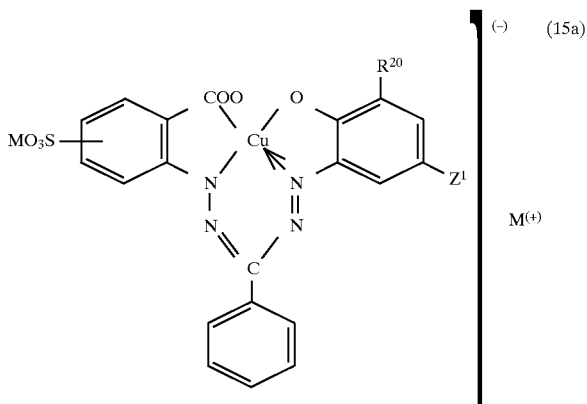

(15a)

in which M and $Z^1$ have the above-mentioned, especially preferred, meanings, and $R^{20}$ is hydrogen or sulfo.

Triphendioxazine dyes are, for example, those of the formula (16)

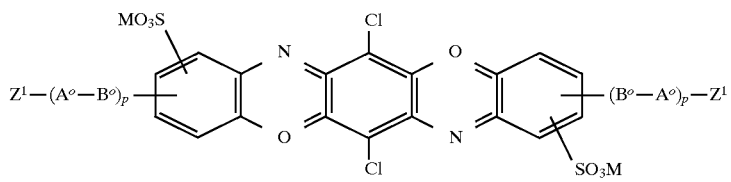

(16)

in which the two sulfo groups —$SO_3M$ on the benzene ring are preferably in the ortho-position with respect to the oxygen atom of the heterocyclic ring, M and Z are as defined above, $B^o$ is the oxy group —O— or, preferably, the amino group —NH—, and $A_o$ is alkylene of 2 to 6 carbon atoms which can be interrupted by 1 or 2 hetero-groups, such as groups selected from —O—, —NH—, —NH—CO— and —CO—NH—, and/or which may be substituted, for example by hydroxy, sulfo, sulfato or carboxy, or is cyclohexylene, and p is the number zero or 1.

Triphendioxazine dyes are, for example, also those of the formula (17)

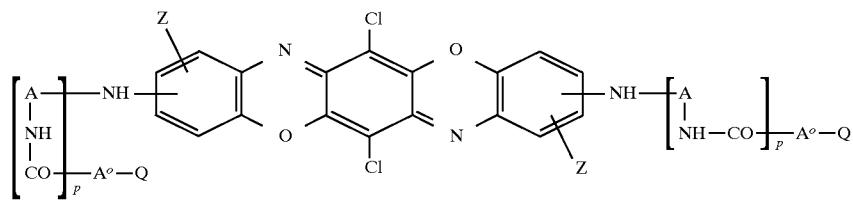

(17)

in which M and Z are as defined above,

A is alkylene of 2 to 4 carbon atoms, $A^0$ is as defined for formula (16), p is the number zero or 1, and Q is sulfo, carboxy or sulfato.

Anthraquinone dyes are, for example, those of the formula (18)

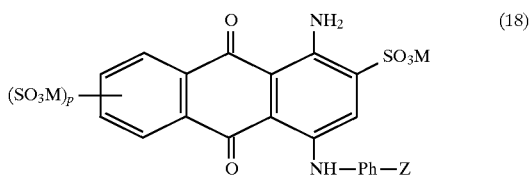

(18)

in which

M, Z and p are defined above and

Ph is phenylene which can be substituted by 1 or 2 substituents from the group consisting of alkyl of 1 to 4 carbon atoms, such as methyl and ethyl, alkoxy of 1 to 4 carbon atoms, such as methoxy and ethoxy, halogen, such as chlorine and bromine, carboxy and sulfo, or is phenylene which is substituted by 3 or 4 methyl groups.

Dyes of the formulae (1) and (1A) are known and described in numerous literature references, such as, for example, in U.S. Pat. Nos. 4,336,190, 4,492,654, 4,046,754, 4,577,015, 3,359,286, 3,268,548 and 3,385,843. Dyes of the formula (2) and processes for their preparation are disclosed in U.S. Pat. No. 3,802,837.

Similarly, the amino compounds of the formula (3) are generally known compounds. Examples of such compounds are N-methyl-N-(β-sulfoethyl)-amine(methyl taurine), N,N-di-(β-hydroxyethyl)-amine, N-methyl-N-(carboxymethyl)-amine, N-methyl-N-(γ-carboxypropyl)-amine, N-ethyl-N-(γ-carboxypropyl)-amine, N-ethyl-N-(β-sulfoethyl)-amine, N-methyl-N-(β-carboxyethyl)-amine, N-ethyl-N-(β-carboxyethyl)-amine and N-methyl-N-(ω-carboxypentyl)-amine.

The dyes of the formula (2) can be prepared by reacting dyes of the formula (1) with an amino compound of the formula (3), for example by adding a quantity of the amine of the formula (3) which is equimolar with the vinylsulfonyl group to a dye of the formula (1), in aqueous solution and carrying out the reaction at a pH of between 7 and 9 and at a temperature of between 25° and 50° C. The dye formed, of the formula (2), can then be isolated in a conventional manner, after neutralization and adjustment of the synthesis solution to a pH of between 4 and 7, preferably between 5.5 and 6.5, using an organic or inorganic acid, for example hydrochloric acid, acetic acid or phosphoric acid, by precipitation with an electrolyte salt (salting out) such as sodium chloride or potassium chloride, or by spray-drying the synthesis solution.

Dyes of the formula (2) can also be prepared by adding the quantity of an amine of the formula (3) which is equimolar with the β-sulfatosulfonyl group to a dye of the formula (1A) in aqueous solution and adding an alkaline inorganic compound, such as sodium hydroxide, sodium carbonate or trisodium phosphate, preferably in aqueous solution, adjusting the pH to between 8.5 and 13, preferably between 9 and 12.5 and, in particular, between 9 and 10.5, and maintaining it at this level during the reaction; depending on the chosen reaction temperature of between 20° and 100° C., preferably between 80° and 95° C., the reaction is over after about 5 to 15 minutes. The intermediate formed from the β-sulfatoethylsulfonyl dye of the formula (1A) is the vinylsulfonyl dye of the formula (2). The reaction time, which should not be substantially exceeded if possible, is, for example, between 5 and 10 minutes at a temperature of between 88° and 92° C. and at a pH of 9, and about 5 minutes at a pH of between 12 and 12.5 at a temperature of between 20° and 25° C. At a pH of between 9 and 10 and a temperature of between 40° and 60° C., the reaction is over after about 15 minutes.

The Dyeing Preparations (A) and (B) may be present in solid form, such as in pulverulent or granulated form, and in liquid form, for instance as an aqueous solution. They can be prepared in a conventional manner by mixing the individual components, such as the dyes of the formulae (1) and (2), or the dye or dyes of the formula (1) and/or (1A) and the amine of the formula (3), if desired with dissolution in water. Dyeing Preparations (A) containing the dyes of the formulae (1) and (2) can also be prepared by adding, in aqueous solution, to 1 mole of a dye (or dyes) of the formula (1) and/or (1A) an alkaline compound such as, for example, indicated above, and an amine of the general formula (3), or mixing them in aqueous solution, in the ratio according to the invention, namely, in terms of the β-sulfatoethylsulfonyl and vinylsulfonyl groups, in the molar-equivalent ratio between the dyes of the formulae (1) and (1A) and the amine (3), and carrying out the reaction in analogy to the abovementioned, especially preferred, process conditions at a temperature of between 20° and 100° C. and at a pH of between 8.5 and 13. After formation of the dye mixture comprising the dye of the formula (1) and the dye of the formula (2), the alkaline synthesis solution is, as indicated above, neutralized and adjusted to a pH of between 4 and 7, and the dye mixture according to the invention is isolated from the synthesis solution by spray-drying or by salting out.

Both the solid dye preparations and their aqueous solutions contain, as is in general conventional in the case of water-soluble dyes, electrolyte salts such as sodium chloride, potassium chloride or sodium sulfate, which come from their precursors or enter the preparation through the synthesis or through the isolation, for example by salting out. The dyeing preparations may additionally comprise the auxiliaries which are conventional for the dyeing of fiber materials with fiber-reactive dyes or for the stabilization of a preparation, examples of such auxiliaries being solubility improvers, such as condensation products of formaldehyde and a non-alkyl-containing or alkyl-containing naphthalene sulfonic acid, the molecular weight of the condensation product preferably being between 5000 and 15,000 and its degree of sulfonation between 80 and 150%, and also wetting agents, siccatives, anti-mold agents, antifoams and water softeners. Moreover, the dyeing Preparations (B) according to the invention can also include even at this stage the quantity, as required for the dyeing utility, of an alkaline agent such as sodium carbonate or trisodium phosphate.

According to the process of the invention, employing the dyeing preparations and polyamide fibers according to the invention, dyeings of high color strength, a high degree of levelness and high cleanness of hue are obtained on the synthetic polyamide fibers with great advantage, which are not obtained for the particular dye of formula (1) or (1A) as such. In addition, the process according to the invention makes it possible to yield on synthetic polyamide fibers markedly better color yields and markedly better fastness properties in comparison to dyeings which are obtainable with dyeing preparations and dyes which have been customary hitherto, and the dyeings obtained according to the invention are distinguished by improved fastness properties and a very high degree of levelness and dye-penetration of the fibre.

Examples of synthetic polyamide fibers which can be dyed with particular advantage using the preparations according to the invention are fibers made of nylon 6 (polycaproamide), nylon 6,6 (polyhexamethylene adipamide), nylon 7 (polyenanthamide), nylon 6,12 (polyhexamethylene dodecamide), nylon 11, nylon 12 and copolyamides of nylon 6,6 or nylon 6, such as polymers made from hexamethylenediamine, ε-caprolactam and adipic acid and polymers prepared from adipic acid, hexamethylendiamine and isophthalic acid, or from adipic acid, hexamethylene diamine and 2-methyl-pentamethylene diamine or 2-ethyl-tetramethylene diamine, therefrom copolyamides of nylon 6,6 containing up to 15% by weight, such as 0.5 to 15% by weight, of polyhexamethylene isophthalamide or poly-(2-methyl)pentamethylene adipamide or poly-(2-ethyl)tetramethylene adipamide and copolyamides of nylon 6 containing up to 15%, such as 0.5 to 1933 5%, by weight of nylon 6,6, being preferred, these fibers having an amino end group content of at least 60, such as 60 to 100, in particular 70 or more than 70, gram-equivalents of amine end groups per 1000 kilograms of nylon fiber, such as an amino end group content of from 70 to 95, preferably from 70 to 85 or 75 to 90, g-equivalents per 1000 kg of polymer (polyamide fiber). Among these, particularly suitable polyamide fibers are those containing at least 85% by weight of polyhexamethylene adipamide or at least 85% by weight of poly-caproamide. Also preferred are those polyamide fiber materials which are composed of at least 85% by weight of polyhexamethylene adipamide and up to 15% by weight, such 0.5 to 15% by weight, of polyhexamethylene isophthalamide, a polyamide product of isophthalic acid and hexamethylenediamine. These fiber materials (polymers) having an amino end group content of at least 60 gram-equivalents possess a Relative Viscosity of from 40 to 60, preferably greater than 45, measured in 90% strength aqueous formic acid at 20° C.

With particular advantage the synthetic polyamide fibres can be dyed, according to the invention, even if present in form of microfibres. The resulting dyeings of these microfibers show a very high degree of levelness and dye penetration. The term microfibers refers to those multifilament fibers which are composed of filaments (obtained by melt spinning) having an individual filament fineness of less than 1 denier (1.1 dTex) (see Chemiefasern/Textilind. 94, 877–800 (1982), "Properties and Production of Micro Filament Yarns").

By means of the process according to the invention for dyeing synthetic polyamide fibres, dyeings of excellent quality, as already mentioned above, on the fiber materials made of synthetic polyamide are obtained, and with particular advantage even on fibers composed of filaments (produced by melt spinning) having an individual filament fineness of 4 denier (4.4 dTex) or less, in particular of 2 denier (2.2 dTex) or less, such as of less than 1.70 denier (1.87 dTex) or even of less than 1 denier (1.1 dTex), such as until to 0.8 denier (0.88 dTex).

In order to obtain a high proportion of free amino end groups in the polymer or polyamide fiber, in addition to the customary hydrolytic cleavage of carboxamide bridges in the formed polymer, an excess of the diamine, such as hexamethylene diamine, is employed even as early as during the synthesis of the polymer, in order thus to obtain an amino end group concentration of at least 60 gram-equivalents, preferably more than 70 and, with particular preference, more than 75 gram-equivalents, of terminal amino groups per 1000 kg of polyamide fiber employed in accordance with the invention. Examples of such diamines, apart from hexamethylenediamine, are 2-methyl-pentamethylenediamine, 2-ethyl-tetramethylenediamine, 1,3-diaminotoluene and 1,4-bis(aminomethyl)cyclohexane.

Polyamide polymers and polyamide fibers of this kind are described in the later Examples B-1 to B-3.

The amide fiber material may be employed in the customary made-up forms, for example as yarn, which may in turn be in the form of hanks or of wound packages, or as woven or knitted fabric or furnishings, like carpets and upholstery fabrics. The amide fibres may also be blended with other synthetic fibers, such as with polyurethane fibres, for example spandex, and/or with cellulosic fibres, such as cotton.

The use, according to the invention, of the Dyeing Preparations (A) and (B) for the dyeing and printing of the polyamide fiber materials can be practiced by customary and already known printing and dyeing procedures, such as from an aqueous dye liquor by the exhaust method at temperatures of between 40° and 130° C., or by padding the fiber material with the dyeing liquor or spraying it the fibre material liquor with subsequent heat treatment of the impregnated material at temperatures of between about 80° and 130° C. by means, for example, of saturated hot steam or by microwave treatment. In general, the fixation of the dyes on the fiber material takes place within the stated temperature range at a pH of between 3 and 7.5, preferably between 3.5 and 7 and, in particular, between 5.5 and 6.5.

Starting from dyeing Preparations (B), the dyeing process is preferably carried out by first of all adding to the aqueous dyeing liquor containing the Preparation (B) an alkaline agent, unless already present, such as sodium hydroxide, sodium carbonate or trisodium phosphate, preferably in aqueous solution, adjusting the mixture to a pH of from 8.5 to 13, preferably from 9 to 10.5, heating the solution at from 60° to 100° C., preferably from 80° to 95° C., for about 10 to 15 minutes, then adjusting the pH to from 3.5 to 7, preferably from 5.5. to 6.5, diluting the dyeing liquor with water if appropriate, depending on the nature of the dyeing procedure to be employed, adding the polyamide fiber material, and then carrying out dyeing within this pH range and, if an exhaust method, at a temperature of between 40° and 110° C., preferably between 60° and 95° C., for from 40 to 90 minutes, subsequently establishing a dyeing temperature of between 40° and 60° C., establishing a pH of between 10 and 11 using an alkaline agent, for example sodium carbonate, continuing dyeing for about 15 minutes within this temperature and pH range, and then finishing the resulting dyeing in a conventional manner, such as by rinsing it with water, by treating it in a bath containing a nonionic detergent at 80° C., by rinsing it with an aqueous bath containing a little acetic acid and then rinsing it again with cold and hot water, and drying it.

If a padding or printing method is used to prepare dyeings of the fiber material, then a possible procedure is first to adjust a concentrated aqueous solution of the dyeing Preparation (B), following the alkaline treatment as described above, to a pH of between 3.5 and 7, to add any auxiliaries required, such as thickeners, to apply the resulting padding liquor or print paste to the fiber material, to subject the padded or printed fiber material to heat treatment at between 80° and 130° C., for example by means of hot air, saturated hot steam or microwave irradiation, for about 15 minutes, then to overpad or overspray with an alkaline aqueous solution, containing, for example, sodium hydroxide, sodium carbonate, trisodium phosphate or water-glass, and to continue the heat treatment for about 15 minutes at from about 60° to 100° C. Subsequently, the dyeing prepared in this way is finished in the conventional manner indicated above.

The dyeing procedure according to the invention is preferably conducted with an exhaust method in a ratio of fiber material to dyeing liquor of from 1:40 to 1:3 within the temperature and pH ranges indicated above (from 40° to 110° C. at a pH of from 3.5 to 7), for example, dyeing hanks of said polyamide fibres in a jigger in a liquor ratio of from 1:3 to 1:10, or dyeing woven and knitted fabrics in a kettle at a liquor ratio of from 1:10 to 1:40, preferably from 1:10 to 1:20. For instance, a particular procedure comprises first of all adding, to an aqueous solution of the dyeing Preparation (B) with a concentration of from about 5 to 10% by weight, an alkaline agent, such as sodium hydroxide, sodium carbonate or trisodium phosphate (unless the alkaline agent is already present in the preparation), in solid form or in the form of an aqueous solution, thereby establishing a pH of between 9 and 11, heating the batch to a temperature of between 60° and 95° C., preferably between 80° and 90° C., holding it in this temperature range while maintaining the chosen pH for about 10 to 15 minutes, then neutralizing it with an aqueous acid such as hydrochloric acid or acetic acid, diluting it with water to the desired liquor ratio, establishing a pH of between 3.5 and 7, preferably between 4 and 6.8, in particular preferably between 5.5 and 6.5, introducing the polyamide fiber material into the dyeing liquor (dyebath) at from 30° to 40° C., after having added, if desired, a conventional auxiliary, heating the dyeing liquor (dyebath) steadily to from 80° to 100° C. over the course of from 15 to 20 minutes, continuing dyeing within this pH range for about 45 to 60 minutes, then reducing the temperature of the liquor or bath to 60° C., establishing a pH of from 10 to 11, preferably 10.5, with an alkaline agent, such as sodium carbonate, continuing dyeing for about 15 minutes at 60° C. and then finishing the dyed fiber material in the manner indicated above by rinsing it, etc.

When dyeing the polyamide fiber material with the aid of a dyeing Preparation (A) comprising dyes of the formulae (1) and (2), an alkaline pretreatment of the aqueous solution of the preparation is unnecessary. The dyeing process in an exhaust dyeing method can follow a procedure, for example, in which the fiber material is introduced into an aqueous dyeing liquor (dyebath) of the dyeing Preparation (A) having a pH of between 3.5 and 7, preferably between 4 and 6.8 and, in particular, between 5.5 and 6.5, in the desired liquor ratio, the dyebath is heated steadily from 40° C. to from 80° to 100° C. over the course of from about 30 to 40 minutes, dyeing is continued within this temperature range for from 45 to 60 minutes, the dyeing liquor (dyebath) is then cooled to 60° C. in the manner indicated above, a pH of between 10 and 11 is established, dyeing is continued for about 15 minutes more, and subsequently the dyed material is finished in the manner indicated.

The dyeing Preparation (A) can be employed similarly in a padding or printing process. In this case, a preferred procedure is to apply an aqueous padding liquor or print paste of the dyeing Preparation (A), whose pH has been adjusted to between 3.5 and 7, preferably between 4 and 6.8, especially between 5.5 and 6.5, to the fibre material, in particular in the form of a woven or knitted fabric, and, in order to fix the dyes, to subject the polyamide fiber material impregnated or printed in this way to heat treatment at between 80° and 130° C., for example by means of hot air, saturated hot steam or microwave irradiation, for about 15 minutes, then to overpad or overspray the fiber material thus treated with an alkaline aqueous solution, containing, for example, sodium hydroxide, sodium carbonate, trisodium phosphate or water-glass, and to continue the heat treatment for about 15 minutes at from about 60° to 100° C. The material dyed in this way is then finished in the conventional manner already indicated.

The Examples which follow serve to illustrate the invention. Parts and percentages are by weight unless stated otherwise. Parts by weight bear the same relation to parts by volume as the kilogram to the liter.

EXAMPLE 1

26 parts (=46 mole equivalents) of the dye of the formula (A)

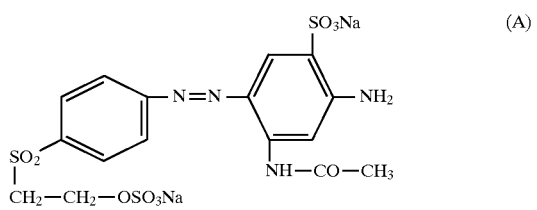

and 1.5 parts (=9.2 mole equivalents) of N-methyltaurine sodium salt are dissolved in a solution of 7 parts of trisodium phosphate in 1000 parts of water at 20° C. The resulting dye solution has a pH of about 10. It is heated to about 90° C. and held at 90° C. for about 10 minutes, then adjusted to a pH of 5.5 with 60% strength aqueous acetic acid and made up with water to a volume of 5000 parts by volume.

20 parts by volume of this stock dyeing solution are taken and made up to 100 parts by volume with water which contains about 0.1% of a commercial wetting agent. This dyebath is entered with 10 parts of a fabric made from the nylon fiber described in the later Example B-1, the pH of the dyebath is adjusted to 5.5 with acetic acid, and the bath is then heated steadily over the course of 30 minutes to 98° C. The dyeing process is continued at this temperature for 45 minutes, and the bath is then cooled to 60° C., adjusted to a pH of 10.5 with concentrated aqueous sodium hydroxide solution, and held at this pH and at the temperature of 60° C. for 15 minutes.

The bath is subsequently drained and the dyed fabric is finished in a conventional manner by rinsing it with cold water, washing it in an aqueous bath containing a nonionic detergent at 80° C., rinsing it again in a bath containing a little acetic acid at 40° C., and finally rinsing it with cold water, centrifuging it and drying it.

A dyeing of high depth of color is obtained which has a clean and clear golden yellow hue. The dyeing is distinguished by a high degree of levelness and is stronger in color, cleaner and brighter than when the dye (A) is used alone.

EXAMPLE 2

A solution of 24 parts (=38 mole equivalents) of the dye of the formula (B)

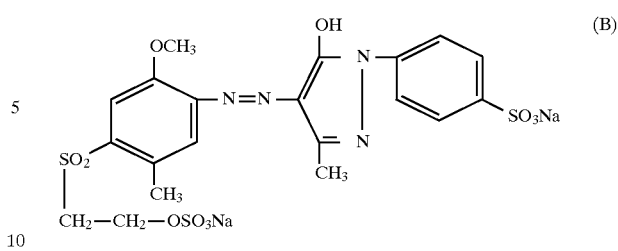

in 1000 parts of water is admixed with 60 parts by volume of a 10% strength aqueous trisodium phosphate solution. The mixture is heated to 85° C. and held at this temperature until a constant pH of about 9.2 is established, then stirred for about 5 minutes more; then, 2.14 parts (=13.3 mole equivalents) of the sodium salt of N-methyltaurine are added, stirring is continued for about 3 minutes, the pH is adjusted to about 6 with acetic acid and the mixture is cooled to room temperature and made up to 5000 parts by volume with water.

20 parts by volume of this stock solution are diluted with 80 parts of water. This dyebath is entered with 10 parts of a yarn made from the polyamide fiber described in the later Example B-1. The fabric is first of all agitated in the bath at 20° C. for 5 minutes, and then the dyebath is heated over the course of 30 minutes to 90° C. and dyeing is continued at this temperature for 45 minutes while maintaining a pH of about 5.5 (by means of dilute aqueous acetic acid), and then brought to an end at 60° C. and at a pH of 10 for 10 minutes.

The dyebath is subsequently drained and the dyed fabric is finished as described in Example 1.

A dyeing of high color strength is obtained which has a clear and bright yellow hue and a high degree of levelness.

If, on the other hand, the procedure of Example 2 is carried out in accordance with known procedures, without the addition of N-methyltaurine, then the dyeing obtained has an inadequate degree of levelness and a neutral yellow hue.

EXAMPLE 3 a) 120 parts by volume of a 5% strength aqueous trisodium phosphate solution are added to a solution of 24 parts (=38 mole equivalents) of the dye of the formula (B) in 1000 parts of water. The mixture is heated to 85° C. and held at this temperature until a constant pH of 9.2 is established. The mixture is stirred for about 5 minutes more, then, 1.84 parts (=11.4 mole equivalents) of the sodium salt of N-methyltaurine are added, stirring is continued for about 3 minutes, the pH is adjusted to about 6 with acetic acid, and the mixture is cooled to room temperature and spray-dried. A dye powder is obtained, which contains electrolyte salt, with the dyes of the formulae (C) and (D)

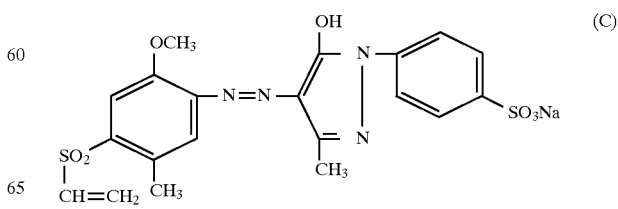

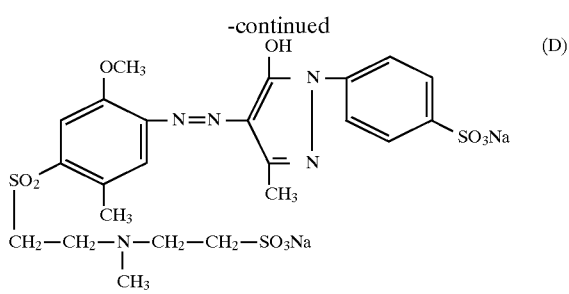

in a molar mixing ratio of about 70:30.

b) About 0.2 part of this dye powder is dissolved in 200 parts of water at 20° C. 10 parts of a fabric of the polyamide fiber described in the later Example B-1 are added, a pH of 5.5 is established using dilute aqueous acetic acid if necessary, the fabric is agitated in the dyebath for a few minutes, and this bath is then heated to 90° C. over the course of 30 minutes. The dyeing process is continued for 45 minutes while maintaining a pH of 5.5. After the dyebath has cooled, a pH of about 10.5 is established and dyeing is finished with further agitation of the fabric after about 15 minutes. The fabric is removed from the bath and finished by the procedure indicated in Example 1.

A dyeing of high color strength is obtained which has a clear and bright yellow hue and a high degree of levelness.

EXAMPLE 4

65 parts of an electrolyte salt (largely sodium chloride) containing dyestuff powder, containing 31 parts (=50 mole equivalents) of the dye of the formula (E)

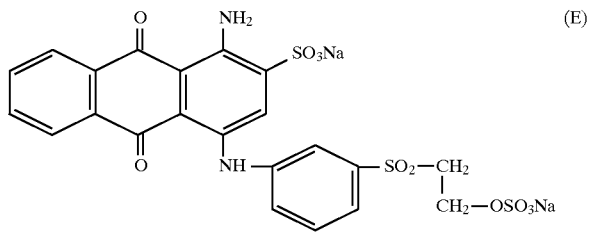

and 3.2 parts (=20 mole equivalents) of N-methyltaurine sodium salt, are dissolved in a solution of 4 parts of sodium carbonate in 1000 parts of water at 20° C. The resulting dye solution has a pH of 9 to 10. It is heated to about 90° C. and held at 90° C. for about 10 minutes, then adjusted to a pH of 5.5 with 50% strength aqueous acetic acid and made up with water to a volume of 5000 parts by volume.

20 parts by volume of this stock dyeing solution are taken and made up to 100 parts by volume with water which contains about 0.2% of a commercial wetting agent. This dyebath is entered with 10 parts of a fabric made from the nylon fiber described in the later Example B-1, the pH of the dyebath is adjusted to 5.5 with acetic acid, and the bath is then heated steadily over the course of 50 minutes to 98° C. The dyeing process is continued at this temperature for 45 minutes, and the bath is then cooled to 60° C., adjusted to a pH of 10.5 with concentrated aqueous sodium hydroxide solution, and held at this pH and at the temperature of 60° C. for 15 minutes.

The bath is subsequently drained and the dyed fabric is finished in a conventional manner by rinsing it with cold water, washing it in an aqueous bath containing a nonionic detergent at 80° C., rinsing it again in a bath containing a little acetic acid at 40° C., and finally rinsing it with cold water, centrifuging it and drying it.

A dyeing of high depth of color is obtained which has a clean and clear blue hue. The dyeing is distinguished by a high degree of levelness.

EXAMPLE 5

33 parts (=33 mole equivalents) of the dye of the formula (F)

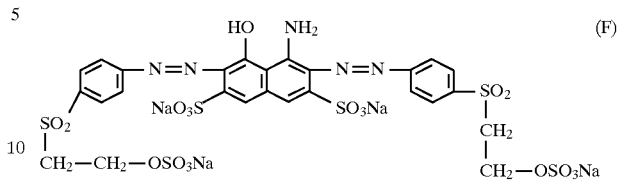

and 2.4 parts (=17 mole equivalents) of N-methyltaurine are dissolved in a solution of 10 parts of trisodium phosphate in 1000 parts of water at 20° C. The resulting dye solution has a pH of about 10. It is heated to about 90° C. and held at 90° C. for about 10 minutes, then adjusted to a pH of 5.5 with 50% strength aqueous acetic acid and made up with water to a volume of 5000 parts by volume.

20 parts by volume of this stock dyeing solution are taken and made up to 100 parts by volume with water which contains about 0.1% of a commercial wetting agent. This dyebath is entered with 10 parts of a fabric made from the nylon fiber described in the later Example B-1, the pH of the dyebath is adjusted to 5.5 with acetic acid, and the bath is then heated steadily over the course of 30 minutes to 98° C. The dyeing process is continued at this temperature for 45 minutes, and the bath is then cooled to 60° C., adjusted to a pH of 10.5 with concentrated aqueous sodium hydroxide solution, and held at this pH and at the temperature of 60° C. for 15 minutes.

The bath is subsequently drained and the dyed fabric is finished in a conventional manner by rinsing it with cold water, washing it in an aqueous bath containing a nonionic detergent at 80° C., rinsing it again in a bath containing a little acetic acid at 40° C., and finally rinsing it with cold water, centrifuging it and drying it.

A dyeing of high depth of color is obtained which has a clear navy hue. The dyeing is distinguished by a high degree of levelness.

EXAMPLE 6

28 parts (=50 mole equivalents) of the dye of the formula (G)

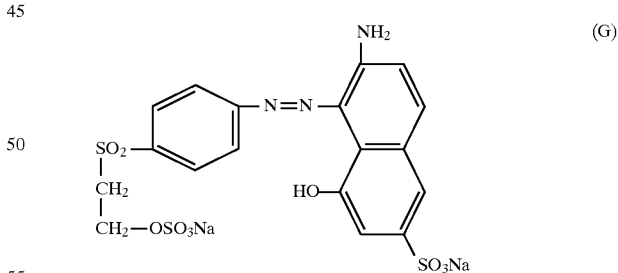

and 1.6 parts (=10 mole equivalents) of N-methyltaurine sodium salt are dissolved in a solution of 7 parts of trisodium phosphate in 1000 parts of water at 20° C. The resulting dye solution has a pH of about 10. It is heated to about 90° C. and held at 90° C. for about 10 minutes, then adjusted to a pH of 5.5 with 60% strength aqueous acetic acid and made up with water to a volume of 5000 parts by volume.

20 parts by volume of this stock dyeing solution are taken and made up to 100 parts by volume with water which contains about 0.2% of a commercial wetting agent. This dyebath is entered with 10 parts of a fabric made from the nylon fiber described in the later Example B-1, the pH of the dyebath is adjusted to 5.5 with acetic acid, and the bath is then heated steadily over the course of 30 minutes to 98° C. The dyeing process is continued at this temperature for 45 minutes, and the bath is then cooled to 60° C., adjusted to a pH of 10.5 with concentrated aqueous sodium hydroxide solution, and held at this pH and at the temperature of 60° C. for 15 minutes.

The bath is subsequently drained and the dyed fabric is finished in a conventional manner by rinsing it with cold water, washing it in an aqueous bath containing a nonionic detergent at 80° C., rinsing it again in a bath containing a little acetic acid at 40° C., and finally rinsing it with cold water, centrifuging it and drying it.

A dyeing of high depth of color is obtained which has a clean and clear red hue. The dyeing is distinguished by a high degree of levelness.

EXAMPLE 7

In accordance with the details in Example (3a), the two dyes of the formulae (H) and (J)

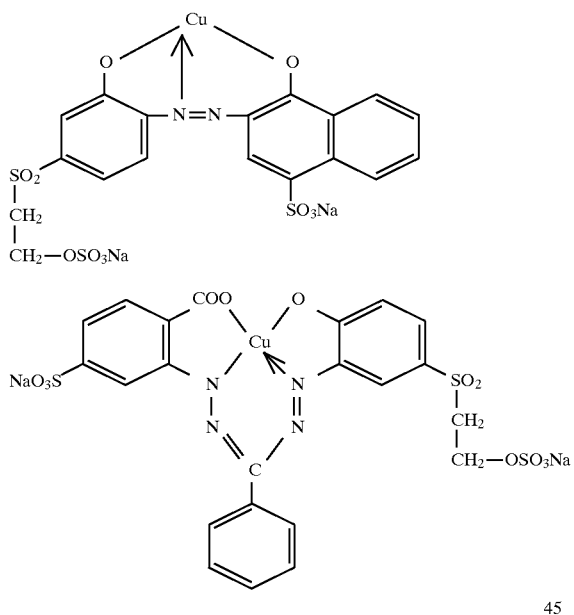

and the dye of the formula (B) are reacted, in each case in separate batches, with trisodium phosphate and, in the mole equivalent portions indicated in Example (3a), with N-methyltaurine.

The dye powders obtained after spray-drying from the dyes (B), (H) and (J) are mixed with one another in a ratio of 20:10:6 parts. 0.36 part of this dye mixture is used to dye 10 parts of the polyamide fiber fabric of Example B-1 by analogy with the information given in Example (3b). A reddish brown dyeing of high color strength and with a high degree of levelness is obtained.

EXAMPLE 8

In accordance with the information given in Example (3a), the dyes of the formulae (E) and (H) and the dye of the formula (K)

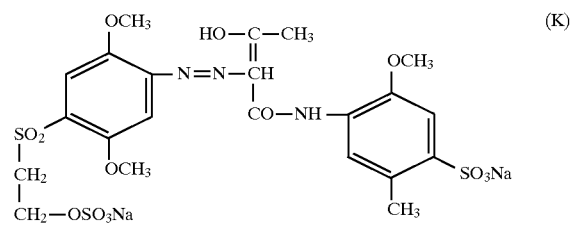

are reacted, in each case in separate batches, with trisodium phosphate and, in the mole equivalent portions indicated in Example (3a), with N-methyltaurine.

The dye powders obtained after spray-drying from the dyes (E), (H) and (K) are mixed with one another in a ratio of 5:5:8 parts. 0.36 part of this dye mixture is used to dye 10 parts of the polyamide fiber fabric of Example B-1 by analogy with the information given in Example (3b). A brown dyeing of high color strength and with a high degree of levelness was obtained.

EXAMPLE 9

23 parts (=30 mole equivalents) of the dye of the formula (J) and 1.1 parts (=12 mole equivalents) of N-methylaminoacetic acid are dissolved in a solution of 5 parts of trisodium phosphate in 1000 parts of water at 20° C. The resulting dye solution has a pH of about 10. It is heated to about 90° C. and held for about 10 minutes at 90° C., then adjusted to a pH of 5.5 with 50% strength aqueous acetic acid and made up with water to a volume of 5000 parts by volume.

20 parts by volume of this stock dyeing solution are taken and made up to 100 parts by volume with water which contains about 0.2% of a commercial wetting agent. This dyebath is entered with 10 parts of a fabric made from the nylon fiber described in the later Example B-1, the pH of the dyebath is adjusted to 5.5 with acetic acid, and the bath is then heated steadily over the course of 30 minutes to 98° C. The dyeing process is continued at this temperature for 45 minutes, and the bath is then cooled to 60° C., adjusted to a pH of 10.5 with concentrated aqueous sodium hydroxide solution, and held at this pH and at the temperature of 60° C. for 15 minutes.

The bath is subsequently drained and the dyed fabric is finished in a conventional manner by rinsing it with cold water, washing it in an aqueous bath containing a nonionic detergent at 80° C., rinsing it again in a bath containing a little acetic acid at 40° C., and finally rinsing it with cold water, centrifuging it and drying it.

A dyeing of high depth of color is obtained which has a clean and clear blue hue. The dyeing is distinguished by a high degree of levelness.

EXAMPLE 10

30 parts (=50 mole equivalents) of the dye of the formula (L)

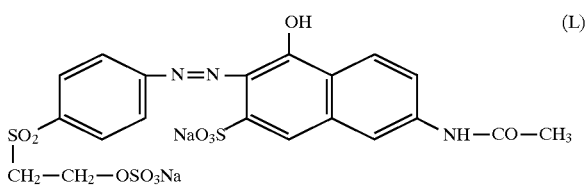

and 1.3 parts (=12.5 mole equivalents) of diethanolamine are dissolved in a solution of 7 parts of trisodium phosphate in 1000 parts of water at 20° C. The resulting dye solution has a pH of about 10. It is heated to about 90° C. and held for about 10 minutes at 90° C., then adjusted to a pH of 5.5 with 60% strength aqueous acetic acid and made up with water to a volume of 5000 parts by volume.

20 parts by volume of this stock dyeing solution are taken and made up to 100 parts by volume with water which contains about 0.1% of a commercial wetting agent. This dyebath is entered with 10 parts of a fabric made from the nylon fiber described in the later Example B-1, the pH of the dyebath is adjusted to 5.5 with acetic acid, and the bath is then heated steadily over the course of 30 minutes to 98° C. The dyeing process is continued at this temperature for 45 minutes, and the bath is then cooled to 60° C., adjusted to a pH of 10.5 with concentrated aqueous sodium hydroxide solution, and held at this pH and at the temperature of 60° C. for 15 minutes.

The bath is subsequently drained and the dyed fabric is finished in a conventional manner by rinsing it with cold water, washing it in an aqueous bath containing a nonionic detergent at 80° C., rinsing it again in a bath containing a little acetic acid at 40° C., and finally rinsing it with cold water, centrifuging it and drying it.

A dyeing of high depth of color is obtained which has a clean and clear golden orange hue. The dyeing is distinguished by a high degree of levelness and is stronger in color, cleaner and brighter than when the dye (L) is used alone.

EXAMPLE 11

91 parts of an electrolyte salt containing (mostly sodium chloride containing) dyestuff powder, containing 33 parts (=33 mole equivalents) of the dye of the formula (F), 2.4 parts (=17 mole equivalents) of N-methyltaurine and 10 parts of trisodium phosphate are dissolved in 1000 parts of water at 20° C. The resulting dye solution has a pH of about 10. It is heated to about 90° C. and held at 90° C. for about 10 minutes, then adjusted to a pH of 5.5 with 50% strength aqueous acetic acid and made up with water which contains about 0.1% of a commercial wetting agent, to a volume of 25 000 parts by volume.

This dyebath is entered with 2500 parts of a fabric made from the nylon fiber described in the later Example B-1, the pH of the dyebath is adjusted to 5.5 with acetic acid, and the bath is then heated steadily over the course of 30 minutes to 98° C. The dyeing process is continued at this temperature for 45 minutes, and the bath is then cooled to 60° C., adjusted to a pH of 10.5 with concentrated aqueous sodium hydroxide solution, and held at this pH and at the temperature of 60° C. for 15 minutes.

The bath is subsequently drained and the dyed fabric is finished in a conventional manner by rinsing it with cold water, washing it in an aqueous bath containing a nonionic detergent at 80° C., rinsing it again in a bath containing a little acetic acid at 40° C., and finally rinsing it with cold water, centrifuging it and drying it.

Like in Example 5, a dyeing of high depth of color and a high degree of levelness, having a clear navy hue, is obtained.

EXAMPLES 12 to 15

In order to carry out the dyeing process according to the invention and to prepare a dye mixture employed herein according to the invention, a procedure of one of Examples 1 to 3 or 11 is followed but using, instead of the dye (A) or (B) or (F) employed therein, one of the dyes of the formula (M) to (P) of the subsequent Tabular Examples in the molar-equivalent quantity indicated in Example 1, 2 or 3 or 11. In each case, a dyeing of high color strength is obtained on the polyamide fiber fabric, which dyeing has a high degree of levelness and cleanness of shade in the hue indicated in the particular Tabular Example.

| Ex. | Dye of the formula . . . | | Hue |
|---|---|---|---|
| 12 | structure shown below | (M) | red-violet |

Structure for (M): Cu complex with two O-ligands bridging an azo group; left ring bears SO₂—CH₂—CH₂—OSO₃Na, central has NaO₃S, right naphthalene bears NH₂.

| Ex. | Dye of the formula . . . | Hue |
|---|---|---|
| 13 | (N) [Cu-complex azo dye structure with NH—CO—CH₃, SO₃Na groups, OCH₃, and SO₂—CH₂—CH₂—OSO₃Na substituents] | reddish blue |
| 14 | (O) [Azo dye structure with chlorotriazine linked via NH—CH₂—CH₂—O—(CH₂)₂—CH₂=CH—SO₂, with HO, SO₃Na, and SO₂—CH₂—CH₂—OSO₃Na groups] | red |
| 15 | (−) (P) [Cu-complex formazan dye with NaO₃S, COO, SO₂—CH₂—CH₂—OSO₃Na groups and phenyl] Na(+) | greenish blue |

Comparison Example I

If the procedure according to the above Tabular Examples is followed using one of the indicated dyes only in accordance with the prior art, i.e. without the addition of N-methyltaurine or one of the other amino compounds conforming to the general formula (3), then dyeings are obtained in the abovementioned hue but they are lacking in brightness and clarity; in addition, the dyeings exhibit some instances of unlevelness in the individual fiber regions.

EXAMPLES 16 to 27

In order to carry out the dyeing process according to the invention and to prepare a dye mixture employed herein according to the invention, a procedure of Example 1, 2 or 3 or 11 is followed but using, instead of the dyes (A) or (B) or (F) employed therein, one of the dyes indicated below by its formula and an amino compound of the formula (3), in the molar-equivalent ratio indicated in the respective Tabular Example. Using the indicated Dyeing Preparations (B), forming, in the course of the procedure, in situ the dye mixtures with dyes conforming to formulae (1) and (2), dyeings of high color strength are obtained on the synthetic polyamide fiber fabric which have a high degree of levelness and a clean color shade in the hue indicated in the corresponding Tabular Example.

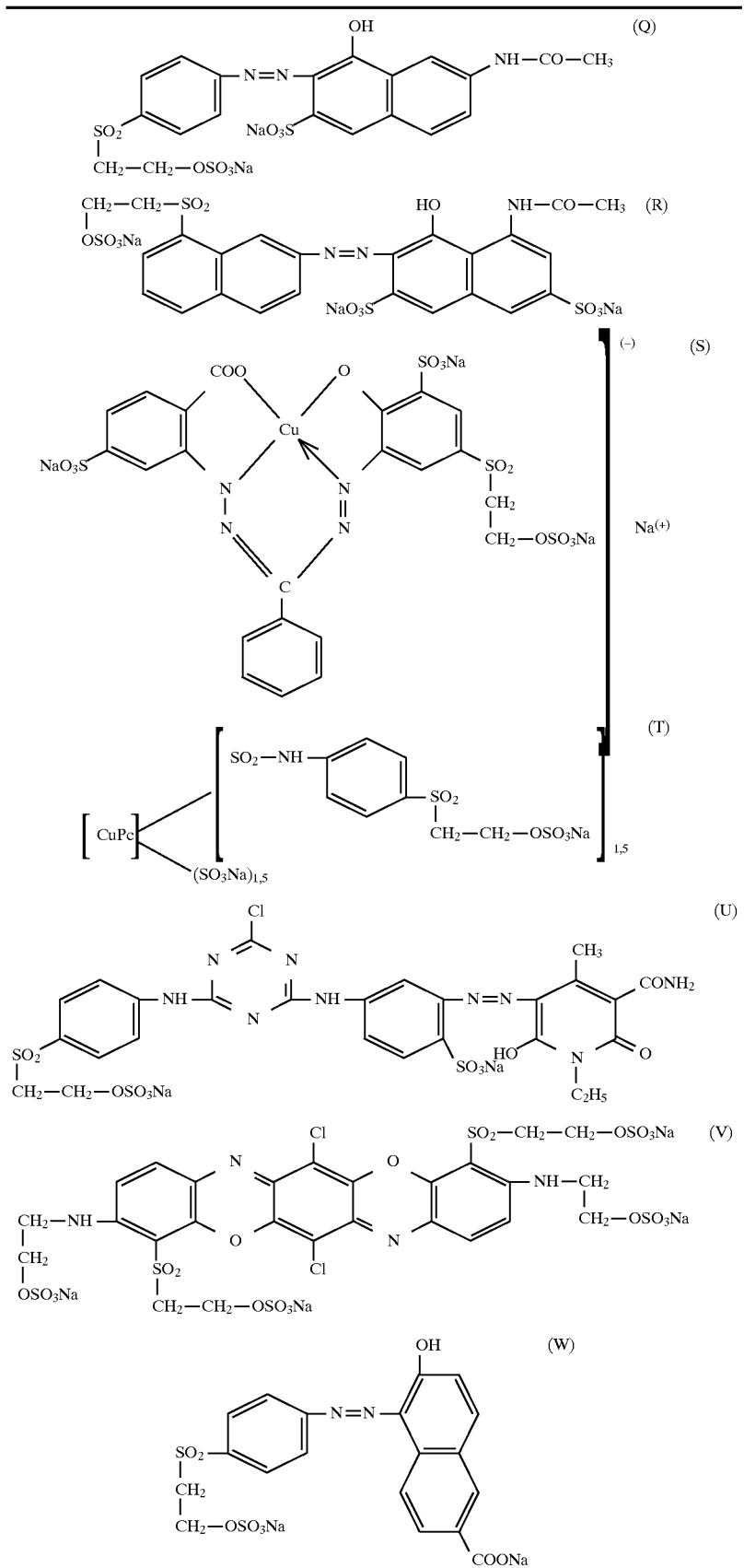

-continued

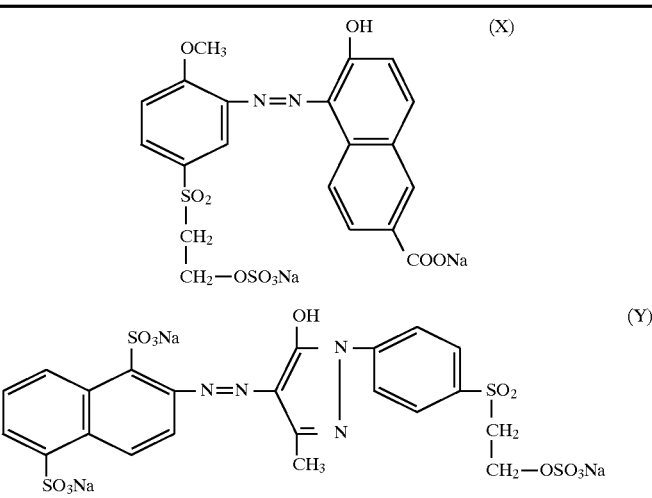

| Ex. | Dye of the formula | Amine (3) | Mole equivalent Dye:amine (3) | Hue |
|---|---|---|---|---|
| 16 | (K) | N-methyltaurine | 100:30% | lemon yellow, bright |
| 17 | (L) | " | 100:25% | golden orange |
| 18 | (Q) | " | 100:25% | reddish orange, bright |
| 19 | (R) | " | 100:20% | orange, bright |
| 20 | (S) | " | 100:30% | greenish blue, bright |
| 21 | (T) | " | 100:40% | turquoise, bright |
| 22 | (U) | " | 100:25% | lemon yellow |
| 23 | (V) | " | 100:45% | royal blue, bright |
| 24 | (W) | " | 100:25% | reddish yellow, bright |
| 25 | (X) | " | 100:25% | reddish orange, bright |
| 26 | (J) | " | 100:40% | reddish blue |
| 27 | (Y) | " | 100:30% | greenish yellow, bright |

Comparison Example II

If the procedure according to the above Tabular Examples is followed using one of the indicated dyes alone in accordance with the prior art, i.e. without the addition of N-methyltaurine or another of the amino compounds indicated of the formula (3), then dyeings are obtained in the abovementioned hue which are lacking in brightness and clarity; in addition, the dyeings exhibit some instances of unlevelness in the individual fiber regions.

EXAMPLE II (Preparation of Nylon-6,6 Homopolymer)

Nylon-6,6 homopolymer is prepared from a 51.5% aqueous solution of nylon-6,6 salt (prepared from hexamethylene diamine and adipic acid) placed in an agitated vessel with 44 parts per million of an antifoaming agent. This mixture is evaporated by heating from room temperature to 155° C. under 2.7 bar absolute pressure. Evaporation is terminated at 80 to 85% solids content. The concentrated slurry is transferred under an inert gas (nitrogen) to an autoclave and heat applied to the vessel to raise the temperature of the mixture. The autogenous pressure in the autoclave is maintained at 18.2 bar absolute. At 230° C. and 18.2 bar absolute, 3300 parts per million of a 40% aqueous dispersion of $TiO_2$ are injected into the autoclave using a 20 bar nitrogen pressure. At 245° C. the pressure in the autoclave is reduced to atmospheric pressure and further reduced to 0.65 bar absolute by the application of vacuum to the vessel and maintained for a period of about 30 minutes. The temperature of the vessel is maintained above the melt temperature of the polymer now formed, and the vessel pressure is then increased to atmospheric by removal of vacuum and introduction of dry nitrogen. Pressurised nitrogen at 4 to 5 bar absolute at about 285° C. is introduced to the vessel. The overpressure allows the polymer melt to flow, in the form of laces, from a vessel opening into a current of cooling water. These quenched laces of polymer are chipped (granulated) and further cooled with water. The polymer chips (about 4 mm long by 3 mm diameter) are then separated from the water and dried in air to a temperature below about 60° C. The resulting nylon-6,6 homopolymer has a relative viscosity (RV) of 38 to 41 as measured in 90% formic acid, indicative of a balance between amine and carboxy end groups. The measured amine end groups are typically about 45 gram equivalents per 1000 kg of polymer (as measured by titration and comparison to known polymer standard samples). The polymer so prepared contains 0.24 to 0.31% titanium dioxide ($TiO_2$) delustrant.

The nylon-6,6 homopolymer chips, prepared as above, are melted in a screw extruder, and the molten polymer is fed via a pump to a spinneret at about 285° C., having 92 circular holes, the pump delivering the polymer at a rate of 0.479 gram/hole/minute. The resulting nylon filaments are cooled by a cross flow of air converged into a multifilament yarn, oiled and wound up at 4200 meters/minute on a winder 4 meters below the spinneret. The yarns so prepared are false twist draw textured to achieve a yarn denier of 85, with 0.92 denier per filament based on 92 filaments. The textured yarns are knitted into hosiery tubes for subsequent dyeing using a dyeing compositions disclosed herein, such as, for example, that of Example 3. A colour wash fastness test of said dyeing performed according to the regulations of ISO C06/C2 using 4 grams of ECE detergent and 1 gram of sodium perborate bleach per liter of water at 60° C., gives a wash fastness rating of 3. Cold water colour fastness done on the same dyeing according to ISO E01 gives a rating of 3.

EXAMPLE B-1

(Preparation of Nylon-6,6/6-Copolymer with Enhanced Amine End Groups)

A 51.5% aqueous solution of nylon-6,6 salt (prepared from hexamethylene diamine and adipic acid) is added to a 40% aqueous solution of ε-caprolactam in the ratio of 194.000:35.000 parts along with 86 parts of an 30% aqueous hexamethylenediamine solution (the amount of excess diamine is determined by experimentation since some diamine is lost by evaporation) and 10 parts of an antifoaming agent. This mixture is transferred to an evaporator and water is evaporated until the temperature of the evaporator reaches 155° C. at a pressure of 2.7 bar absolute; evaporation is then terminated. The concentrated mixture is processed exactly as that outlined above in Example A for nylon-6,6 homopolymer. The nylon-6,6/6-copolymer (85:15%) so formed has 67 to 73 gram equivalents of amine end groups per 1000 kg of polymer (as determined by titration and comparison with know standard polymer sample) and a RV of 52.5 and contains about 0.3% $TiO_2$ delustrant.

The nylon polymer so obtained is melt spun according to Example A, however, using the two spinneret configurations to achieve 60 denier by 68 filaments for a denier per filament of 0.88 after false draw texturing and 78 denier by 46 filaments for 1.69 denier per filament after texturing. These yarns are knitted and used for dyeing with dye compositions as herein disclosed, for example, that of Example 3. The colour wash fastness rating is 4–5, and the cold water fastness test rating is 4.

EXAMPLE B-2

(Preparation of Nylon-6.6/6-Isophthalic Acid Copolymer with Enhanced Amine End Groups)

A 51.5% aqueous solution of nylon-6,6 salt (prepared from a mixture of hexamethylene diamine and adipic acid) is added to a 36% aqueous solution of nylon-6,iPa salt prepared from a mixture of hexamethylenediamine and isophthalic acid (iPa) in the ratio of 196,000:41,400 parts along with 97 parts of adipic acid and 10 parts of an antifoaming agent. The mixture is transferred to an evaporator and processed exactly in the manner outlined above in Example A. The nylon-6,6/6,iPa copolymer (87:13%) formed has 67 to 73 gram equivalents of amine end groups per 1000 kg of polymer (as determined by titration and comparison with known standard polymer sample) and a RV of 55.0 and contains 0.3% $TiO_2$ delustrant.

The nylon-6,6/6,iPa copolymer with enhanced amine end groups so obtained is melt spun under the same conditions as in Example A and textured to achieve a yarn denier of 58 with 0.92 to denier per filament based on 92 filaments. This polymer can also be spun using three other spinneret configurations to achieve 60 denier by 68 filaments or 0.88 denier per filament (after false twist draw texturing) and 78 denier by 46 filaments or 1.69 denier per filament after texturing, and 78 denier by 20 filaments or 3.90 denier per filament. The yarns so prepared are knitted and used for dyeing with dye compositions as herein disclosed, for example, with that of Example 3. Colour wash fastness rating of the dyeing is 4–5, and cold water fastness tests is rated 4.

EXAMPLE B-3

(Preparation of Nylon-6 Homopolymer with Enhanced Amine End Groups)

A 40% aqueous solution of ε-caprolactam along with 400 to 500 parts per million of a 30% aqueous hexamethylene diamine solution and 10 parts of an antifoaming agent is transferred to an evaporator, and water evaporates until the temperature of the evaporator reaches 155° C. at a controlled pressure of 2.7 bar absolute, at which point evaporation is terminated. The concentrated mixture is then processed exactly as that outlined above in Example A. The nylon-6 polymer formed has 67 to 73 gram equivalents of amine end groups per 1000 kg of polymer (as determined by titration and comparison with know standard polymer sample) and a RV of 52.2 and contains about 0.3% $TiO_2$ delustrant. The chips are melt spun as described in Example A and used for dyeing with employing dye compositions of the instant invention, such as that of Example 3. In this case, the dyeing rated a colour wash fastness of 4–5 and a cold water fastness of 4.

We claim:

1. A dyeing process comprising: dyeing a fibrous article with a coloring agent, said fibrous article containing a polyamide polymer with an amino end group content of at least 60 gram equivalents per 1000 kilograms of polyamide polymer, said coloring agent comprising at least one of the following dyeing compositions:

A. at least one dye of the formula (1)

and at least one dye of the formula (2)

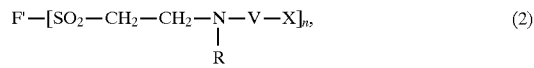

wherein F' is the dye radical and is identical in formulas (1) and (2), the dye or dyes of the formula (1) and the dye or dyes of formula (2) being present in said coloring agent in a molar-equivalent ratio to one another, in terms of the groups $—(SO_2—CH=CH_2)_n$ and $—[SO_2—CH_2—CH_2N(R)—V—X]_n$, of from 90:10% to 60:40%; or B. at least one dye of the formula (1A)

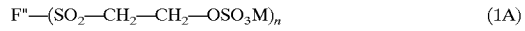

or at least one dye of the formula (1)

or a combination of dyes of the formulas (1A) and (1), and, in any case, at least one compound of the formula (3)

the dye or dyes of the formulae (1A) and (1) and, in relation to the β-sulfatoethylsulfonyl and vinylsulfonyl groups, the compound or compounds of the formula (3) being present in a molar-equivalent ratio to one another of from 100:10% to 100:40%;

wherein, in the formulae (1A), (1), (2) and (3):

F" or F' represents the radical of a mono-, dis- or polyazo dye or heavy metal complex mono-, dis- or trisazo dye or anthraquinone, azomethanine, phenazine, stilbene, triphenylmethane, xanthene, thioxanthene, nitroaryl, naphthoquinone, perylenetetracarbimide, formazan, copper formazan, phthalocyanine, copper phthalocyanine, nickel phthalocyanine or cobalt phthalocyanine dye or triphendioxazine dye, which possesses 1 or 2 groups which impart water-solubility;

n is the number 1 or 2;

M is hydrogen or an alkali metal;

R is hydrogen or alkyl of 1 to 6 carbon atoms, uninterrupted or interrupted by 1 or 2 hetero-groups and unsubstituted or substituted by a sulfo, carboxy, hydroxy, sulfato, phosphato or alkanoylamino of 2 to 5 carbon atoms;

V is a covalent bond or alkylene of 1 to 4 carbon atoms, or a group of the formula —CO—NH—$CH_2$—$CH_2$—; and X is a group which imparts water-solubility, and wherein said dyeing of said fibrous article is carried out at a temperature ranging between 40° and 130° C. and at a pH of between 3 and 7.5.

2. A process according to claim 1, wherein said fibrous article comprises multifilament polyamide fiber containing filaments having an individual filament fineness in the range of from 0.8 to 4 denier and comprising a random copolymer of essentially nylon 6,6 and about 0.5 to 15% by weight of nylon 6, said copolymer having an amine end group content of 60 to 100 gram equivalents per 1000 kilograms of the copolymer and a formic acid relative viscosity of greater than about 45.

3. A process according to claim 1, wherein said fibrous article comprises multifilament polyamide fiber containing filaments having an individual filament fineness of in the range of from 0.8 to 4 denier and comprising a random copolymer of essentially nylon 6,6 and about 0.5 to 15% by weight of poly(hexamethylene isophthalamide), said copolymer having an amine end group content of 60 to 100 gram equivalents per 1000 kilograms of the copolymer and a formic acid relative viscosity of greater than about 45.

4. A process according to claim 1, wherein said fibrous article comprises multifilament polyamide fiber containing filaments having an individual filament fineness in the range of from 0.8 to 4 denier and comprising a nylon copolymer having at least 85% by weight of polycaproamide and an amine end group content of 60 to 100 gram equivalents per 1000 kilograms of the copolymer and a formic acid relative viscosity of greater than about 45.

5. A process according to claim 1, wherein said fibrous article comprises polyamide fiber containing filaments having an individual filament fineness of 2 denier or less.

6. A process according to claim 5, wherein said individual filament fineness is 1 denier or less.

7. A process according to claim 1, wherein said fibrous article comprises polyamide fiber which has an amine end group content of 75 to 90 gram equivalents per 1000 kilograms of polyamide.

8. A process according to claim 1, wherein said fibrous article comprises polyamide yarn.

9. A process according to claim 1, wherein said fibrous article further comprises a cellulose fiber or a synthetic fiber other than a polyamide.

10. A process according to claim 2, wherein said fibrous article comprises polyamide fiber containing filaments having an individual filament fineness of 2 denier or less.

11. A process according to claim 3, wherein said fibrous article comprises polyamide fiber containing filaments having an individual filament fineness of 2 denier or less.

12. A process according to claim 4, wherein said fibrous article comprises polyamide fiber containing filaments having an individual filament fineness of 2 denier or less.

13. A process according to claim 2, wherein said fibrous article comprises polyamide fiber having an amine end group content of 75 to 90 gram equivalents per 1000 kilograms of polyamide fiber.

14. A process according to claim 3, wherein said fibrous article comprises polyamide fiber having an amine end group content of 75 to 90 gram equivalents per 1000 kilograms of polyamide fiber.

15. A process according to claim 4, wherein said fibrous article comprises polyamide fiber having an amine end group content of 75 to 90 gram equivalents per 1000 kilograms of polyamide fiber.

16. A process according to claim 5, wherein said fibrous article comprises polyamide fibre having an amine end group content of 75 to 90 gram equivalents per 1000 kilograms of polyamide fiber.

17. A process according to claim 1, wherein said coloring agent comprises dyeing composition A, and dyeing composition A contains the dye or dyes (1) and the dye or dyes (2) in a molar-equivalent ratio of from 80:20% to 65:35%, calculated on the groups —($SO_2$—CH=$CH_2$)$_n$ and —[$SO_2$—$CH_2$—$CH_2$—N(R)—V—X]$_n$.

18. A process according to claim 1, wherein said coloring agent comprises dyeing composition B, and dyeing composition B contains the dye or dyes of the general formulae (1A) or (1) or a mixture thereof and the compound or compounds of the general formula (3) in a molar-equivalent ratio to one another, related to the β-sulfatoethylsulfonyl and vinylsulfonyl groups, of from 100:20% to 100:35%.

19. A process according to claim 1, wherein, in the dye of formula (2) and the compound of formula (3), the formula radical R is hydrogen, methyl, ethyl or β-hydroxyethyl.

20. A process according to claim 1, wherein, in the dye of formula (2) and the compound of formula (3), the formula radical R is methyl or ethyl.

* * * * *